(12) United States Patent
Qian et al.

(10) Patent No.: US 12,373,729 B2
(45) Date of Patent: Jul. 29, 2025

(54) SYSTEM AND METHOD FOR FEDERATED LEARNING WITH LOCAL DIFFERENTIAL PRIVACY

(71) Applicant: Samsung Electronics Company, Ltd., Suwon si (KR)

(72) Inventors: Jianwei Qian, Mountain View, CA (US); Lichao Sun, Easton, PA (US); Xun Chen, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1155 days.

(21) Appl. No.: 17/085,699

(22) Filed: Oct. 30, 2020

(65) Prior Publication Data

US 2021/0374605 A1  Dec. 2, 2021

Related U.S. Application Data

(60) Provisional application No. 63/031,531, filed on May 28, 2020.

(51) Int. Cl.
*G06N 20/00* (2019.01)
*G06F 21/62* (2013.01)

(52) U.S. Cl.
CPC ......... *G06N 20/00* (2019.01); *G06F 21/6263* (2013.01)

(58) Field of Classification Search
None
See application file for complete search history.

(56) References Cited

U.S. PATENT DOCUMENTS

| | | | |
|---|---|---|---|
| 2011/0139748 A1* | 6/2011 | Donnelly | H01J 37/32045 216/37 |
| 2012/0212375 A1* | 8/2012 | Depree, IV | H01Q 15/0086 977/762 |
| 2017/0134434 A1* | 5/2017 | Allen | H04L 63/105 |

(Continued)

FOREIGN PATENT DOCUMENTS

| KR | 20190103090 | 9/2019 |
|---|---|---|
| KR | 20200010480 | 1/2020 |

OTHER PUBLICATIONS

Shokri, Reza, and Vitaly Shmatikov. "Privacy-preserving deep learning." In *Proceedings of the 22nd ACM SIGSAC conference on computer and communications security*, pp. 1310-1321, 2015.

(Continued)

*Primary Examiner* — Haimei Jiang

(57) ABSTRACT

In one embodiment, a method includes accessing a plurality of initial gradients associated with a machine-learning model from a data store associated with a first electronic device, selecting one or more of the plurality of initial gradients for perturbation, generating one or more perturbed gradients for the one or more selected initial gradients based on a gradient-perturbation model, respectively, wherein for each selected initial gradient: an input to the gradient-perturbation model comprises the selected initial gradient having a value x, the gradient-perturbation model changes x into a first continuous value with a first probability or a second continuous value with a second probability, and the first and second probabilities are determined based on x, and sending the one or more perturbed gradients from the first electronic device to a second electronic device.

15 Claims, 15 Drawing Sheets

(56) References Cited

U.S. PATENT DOCUMENTS

2019/0220703 A1    7/2019  Prakash
2020/0184278 A1*   6/2020  Zadeh .................... G06N 3/044

OTHER PUBLICATIONS

Jayaraman, Bargav, Lingxiao Wang, David Evans, and Quanquan Gu. "Distributed learning without distress: Privacy-preserving empirical risk minimization." In *Advances in Neural Information Processing Systems*, pp. 6343-6354, 2018.
Bebensee, Bjorn. "Local differential privacy: a tutorial." *arXiv preprint arXiv:1907.11908*, Jul. 27, 2019.
Kairouz, Peter, Sewoong Oh, and Pramod Viswanath. "Extremal mechanisms for local differential privacy." In *Advances in neural information processing systems*, pp. 1-51, Apr. 16, 2016.
Erlingsson, Ulfar, Vasyl Pihur, and Aleksandra Korolova. "Rappor: Randomized aggregatable privacy-preserving ordinal response." In Proceedings of the 2014 ACM SIGSAC conference on computer and communications security, pp. 1054-1067, 2014.
Dwork, Cynthia. "Differential privacy: A survey of results." In *International conference on theory and applications of models of computation*, pp. 1-19. Springer, Berlin, Heidelberg, Apr. 25, 2008.
Truex, Stacey, Ling Liu, Ka-Ho Chow, Mehmet Emre Gursoy, and Wenqi Wei. "LDP-Fed: federated learning with local differential privacy." In *Proceedings of the Third ACM International Workshop on Edge Systems, Analytics and Networking*, pp. 61-66, Jun. 5, 2020.
Seif, Mohamed, Ravi Tandon, and Ming Li. "Wireless federated learning with local differential privacy." arXiv preprint arXiv:2002.05151, pp. 1-13, Feb. 13, 2020.

* cited by examiner

```
// Phase 1: Cloud Gradient Optimization
1  CloudUpdate
2  Initialize weights $w_0$;
3  for each round $t = 1, 2, \ldots$ do
4  |   $M_t \leftarrow$ random set of $m_t$ local clients, where $m_t \leq M$;
5  |   $W \leftarrow LocalUpdate(w_t, M_t)$;
6  |   $w_{t+1} \leftarrow \frac{1}{M_t} \sum_{w \in W} w$;
7  return $w_{t+1}$.
   // Phase 2: Local Gradient Optimization
8  LocalUpdate($w, M_t$)
9  Initialize weight array W;
10 for each local client $c \in M_t$ in parallel do
11 |   $w_c \leftarrow w$;
12 |   for each local Epoch $i = 1, 2, \ldots E$ do
13 |   |   for each batch $b \in B$ do
14 |   |   |   $w_c \leftarrow w_c - \gamma \nabla L(w_c; b)$;
15 |   $w_c^* \leftarrow NoisePertubation(w_c)$;
16 |   $W \leftarrow W \cup w_c^*$;
17 $W^* \leftarrow$ Apply shuffling and splitting on W;
18 return $W^*$.
```

*FIG. 8*

1 Prefix the range of the $w$ and then we have fixed $c$ and $r$;
2 for *each parameter $p \in w$* do
3     Sample a Bernoulli variable $u$ such that
4     $\Pr[u = 1] = \frac{(p-c)(e^\epsilon - 1) + r(e^\epsilon + 1)}{2r(e^\epsilon + 1)}$;
5     if *u==1* then
6         $p^* = c + r \cdot \frac{e^\epsilon + 1}{e^\epsilon - 1}$;
7     else
8         $p^* = c - r \cdot \frac{e^\epsilon + 1}{e^\epsilon - 1}$;
9     replace $p$ as $p*$;
10 After perturb all $p \in w$, then we have $w \rightarrow w^*$;
11 return $w^*$.

*FIG. 9*

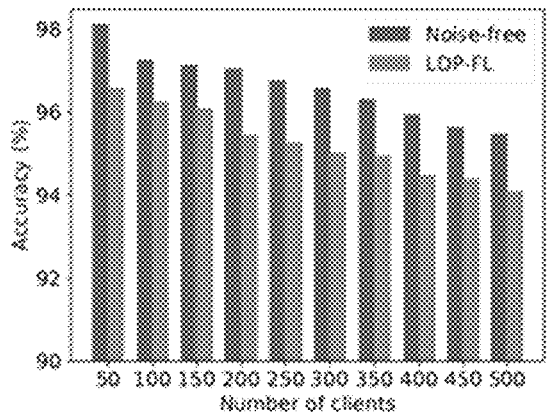
(a) Effect of $k$ on MNIST
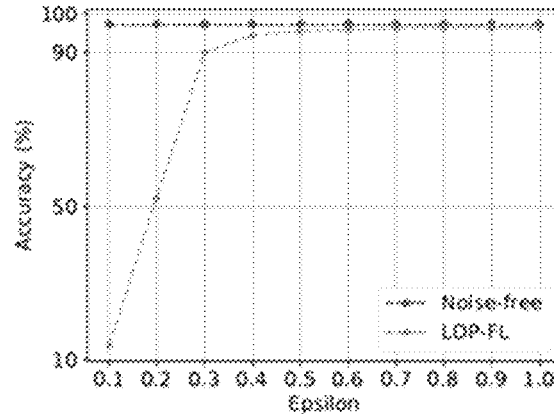
(b) Effect of $\epsilon$ on MNIST
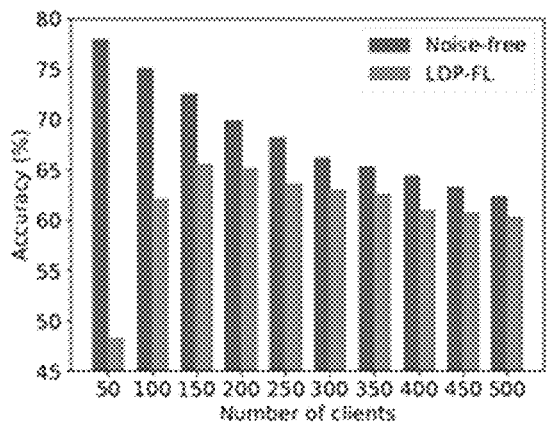
(c) Effect of $k$ on CIFAR
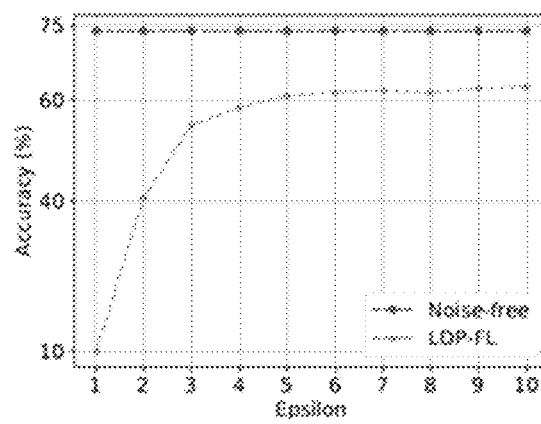
(d) Effect of $\epsilon$ on CIFAR
*FIG. 10*

US 12,373,729 B2

SYSTEM AND METHOD FOR FEDERATED LEARNING WITH LOCAL DIFFERENTIAL PRIVACY

PRIORITY

This application claims the benefit under 35 U.S.C. § 119(e) of U.S. Provisional Patent Application No. 63/031,531, filed 28 May 2020, which is incorporated herein by reference.

TECHNICAL FIELD

This disclosure relates generally to database and file management within network environments, and in particular relates to machine learning for databases and file management.

BACKGROUND

Machine learning (ML) is the study of computer algorithms that improve automatically through experience. It is seen as a subset of artificial intelligence. Machine learning algorithms build a mathematical model based on sample data, known as training data, in order to make predictions or decisions without being explicitly programmed to do so. Usually, when training a machine learning model, one needs to collect a large, representative sample of data from a training set. Data from the training set can be as varied as a corpus of text, a collection of images, and data collected from individual users of a service. Machine learning algorithms are used in a wide variety of applications, such as email filtering and computer vision, where it is difficult or infeasible to develop conventional algorithms to perform the needed tasks.

Internet privacy involves the right or mandate of personal privacy concerning the storing, repurposing, provision to third parties, and displaying of information pertaining to oneself via the Internet. Internet privacy is a subset of data privacy. Privacy concerns have been articulated from the beginnings of large-scale computer sharing. Privacy can entail either personally identifiable information (PII) or non-PII information such as a site visitor's behavior on a website. PII refers to any information that can be used to identify an individual. For example, age and physical address alone could identify who an individual is without explicitly disclosing their name, as these two factors are unique enough to identify a specific person typically. Other forms of PII may soon include GPS tracking data used by apps, as the daily commute and routine information can be enough to identify an individual.

BRIEF DESCRIPTION OF THE DRAWINGS

FIG. 8 illustrates example pseudo-code for federated learning with local privacy perturbation according to particular embodiments.

FIG. 9 illustrates example pseudo-code of an embodiment of a local differential privacy mechanism.

FIG. 10 illustrates example graphs showing effects of data dimension and differential privacy when the model has been trained with pre-assigned perturbation.

DESCRIPTION OF EXAMPLE EMBODIMENTS

Machine-Learning System Overview

Figure 1:
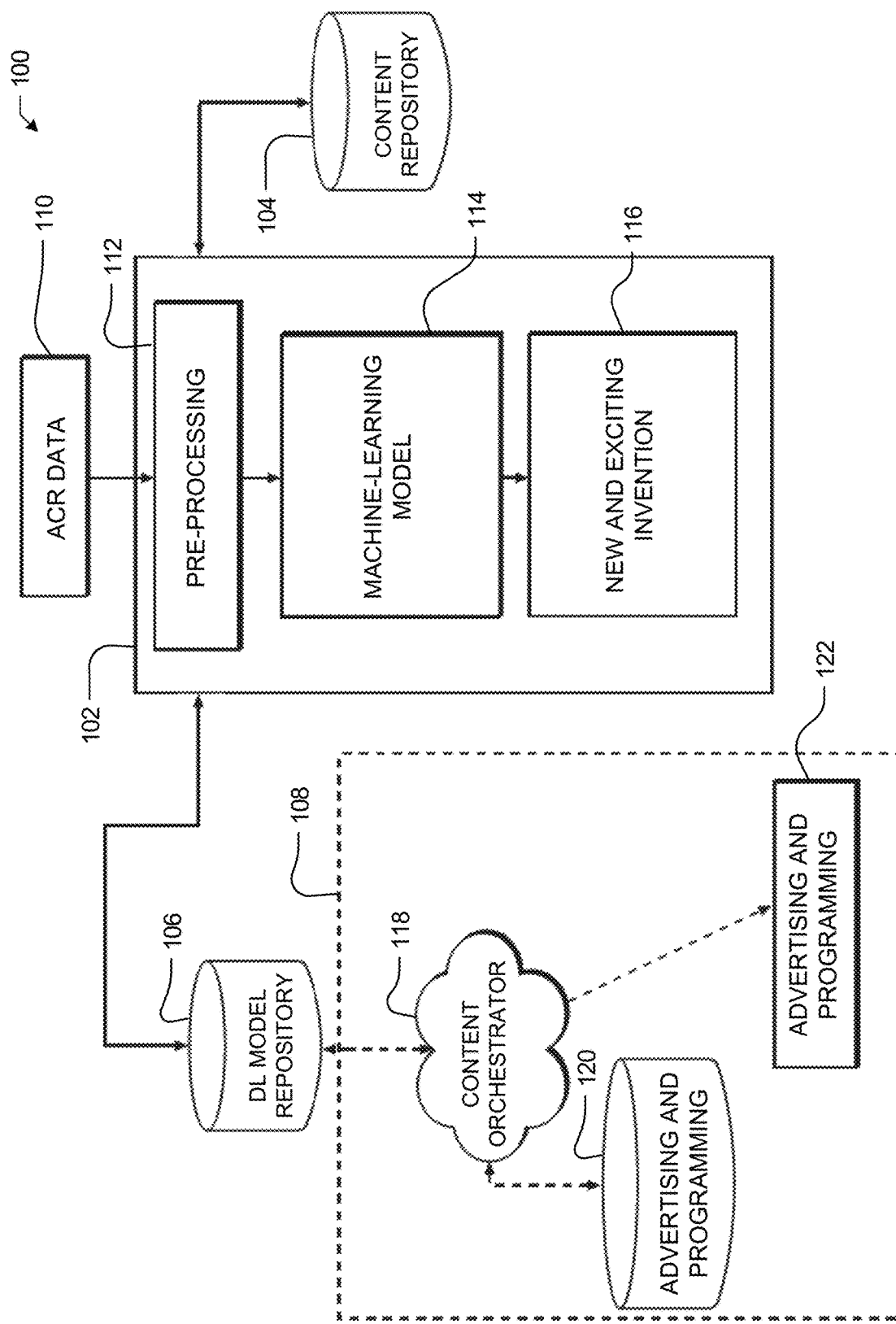
FIG. 1 illustrates an example prediction system, in accordance with presently disclosed embodiments.

FIG. 1 illustrates an example prediction system 100, in accordance with presently disclosed embodiments. As depicted by FIG. 1, the prediction system 100 may include a programming analytics system 102, one or more databases 104, 106, and a TV programming and advertising content subnetwork 108. In particular embodiments, the programming analytics system 102 may include a cloud-based cluster computing architecture or other similar computing architecture that may receive one or more user automatic content recognition (ACR) user viewing data 110, which may be provided by first-party or third-party sources, and provide TV programming content and advertising content to one or more client devices (e.g., a TV, a standalone monitor, a desktop computer, a laptop computer, a tablet computer, a mobile phone, a wearable electronic device, a voice-controlled personal assistant device, an automotive display, a gaming system, an appliance, or other similar multimedia electronic device) suitable for displaying programming and advertising content and/or playing back programming and advertising content. Additionally, the programming analytics system 102 may be utilized to process and manage various analytics and/or data intelligence such as TV programming analytics, web analytics, user profile data, user payment data, user privacy preferences, and so forth. For example, in particular embodiments, the programming analytics system 102 may include a Platform as a Service (PaaS) architecture, a Software as a Service (SaaS) architecture, and an Infrastructure as a Service (IaaS), or other various cloud-based cluster computing architectures.

In particular embodiments, as further depicted by FIG. 1, the programming analytics system 102 may include a pre-processing functional block 112, a deep-learning model functional block 114, and multi-label classification functional block 116. In particular embodiments, the pre-processing functional block 112, the deep-learning model functional block 114, and the multi-label classification functional block 116 may each include, for example, a computing engine. In particular embodiments, the pre-processing functional block 112 may receive the ACR user viewing data 110, which may include, for example, specific programming content (e.g., TV programming) recently viewed by one or more particular users or subgroups of users. For example, the ACR user viewing data 110 may include an identification of the recently viewed programming content (e.g., TV programs), metadata associated with the recently viewed programming content (e.g., TV programs), the particular timeslot (e.g., day-hour) the recently viewed programming content (e.g., TV programs) was viewed within, and the programming channel on which the programming content (e.g., TV programs) was viewed.

In particular embodiments, the pre-processing functional block 112 may then interface with the content database 104 to associate the recently viewed programming content included in the ACR user viewing data 110 with TV programming content stored by the database 104. For example, the TV programming content stored by the database 104 may include, for example, user or subgroup profile data, programming genre data, programing category data, programming clustering category group data, or other TV programming content or metadata that may be stored by the database 104. In particular embodiments, the ACR user viewing data 110 may include time-series data expressed in an hour context and/or day context. For instance, in a particular embodiment, time-series ACR user viewing data 110 may be received, for example, every 2-hour timeslot per 24-hour time period (12 timeslots total per 24-hour day). In some embodiments, different timeslots may be utilized (e.g., 83-hour timeslots per 24-hour time period, 241-hour timeslots per 24-hour time period, 4830-minute timeslots per 24-hour time period, etc.) In particular embodiments, the pre-processing functional block 112 may also perform stratified sampling and data augmentation on the time-series based ACR user viewing data 110 to, for example, augment and up-sample minority classes (e.g., defined as user subgroups with less than 20 examples per unique class). In particular embodiments, the data augmentation may be based on the introduction of Gaussian noise via one or more multiplicative factors.

In particular embodiments, recognizing that certain classifications may include a multi-label classification problem with highly unbalanced classes, the pre-processing functional block 112 may also be utilized, for example, to split the time-series based ACR user viewing data 110 in an N number of datasets before providing to the deep-learning model functional block 114 for training, cross-validating, and testing. Thus, in particular embodiments, the pre-processing functional block 112 may perform the stratified multi-label sampling by, for example, accounting for the existence of one or more disjoint groups within a population and generating samples where the proportion of these groups is maintained. In particular embodiments, in a final pre-processing of the time-series based ACR user viewing data 110 before providing an output to the deep-learning model functional block 114 for training, cross-validating, and testing, the pre-processing functional block 112 may perform a multi-label Synthetic Minority Over-sampling Technique (SMOTE) on the time-series based ACR user viewing training dataset.

In particular embodiments, a final pre-processing of the time-series based ACR user viewing data 110 may be performed before providing an output to the deep-learning model functional block 114 for training, cross-validating, and testing. For example, in particular embodiments, the deep-learning model functional block 114 may receive an N number of datasets (e.g., N arrays of time-series based ACR user viewing data 110 in 2-hour timeslots) generate an N number of long short term (LSTM) layers based thereon. In particular embodiments, outputs of the LSTM layers of the deep-learning model functional block 114 may be combined into a single array utilizing, for example, a concatenation layer of the deep-learning model functional block 114. From the concatenation layer, the deep-learning model functional block 114 may then transfer the single array through one or more dense layers of the deep-learning model functional block 114.

In particular embodiments, from the one or more dense layers, the deep-learning model functional block 114 may then transfer the single array through a sigmoid output layer of the deep-learning model functional block 114. In particular embodiments, the sigmoid output layer of the deep-learning model functional block 114 may include, for example, a number of neurons (e.g., the number of neurons may be equal to the number of classes and/or classification labels) that may be utilized to classify the single array into individual classes, in which one or more final probabilities for individual classification labels may be calculated. In particular embodiments, the deep-learning model functional block 114 may also include a loss function that may be utilized to assign a higher weight to positive classification for individual classification labels, assuming that individual users and/or subgroups of users may typically not exceed more than a maximum number of users (e.g., N users).

For example, as further illustrated by FIG. 1, the programming analytics system 102 may provide the predictions of the individual classification labels to the database 106. In particular embodiments, as further depicted by FIG. 1, a network-based content orchestrator 118 may retrieve the predictions of the individual classification labels from the database 106. The content orchestrator 118 may then store the predictions of the individual classification labels together with TV programming and advertising content to be viewed in a programming and advertising content base 120. In particular embodiments, based on the predictions of the individual classification labels, the content orchestrator 118 may then provide TV programming and advertising content 122 to, for example, an end-user client device for user viewing.

Federated Learning with Local Differential Privacy

Figure 2:
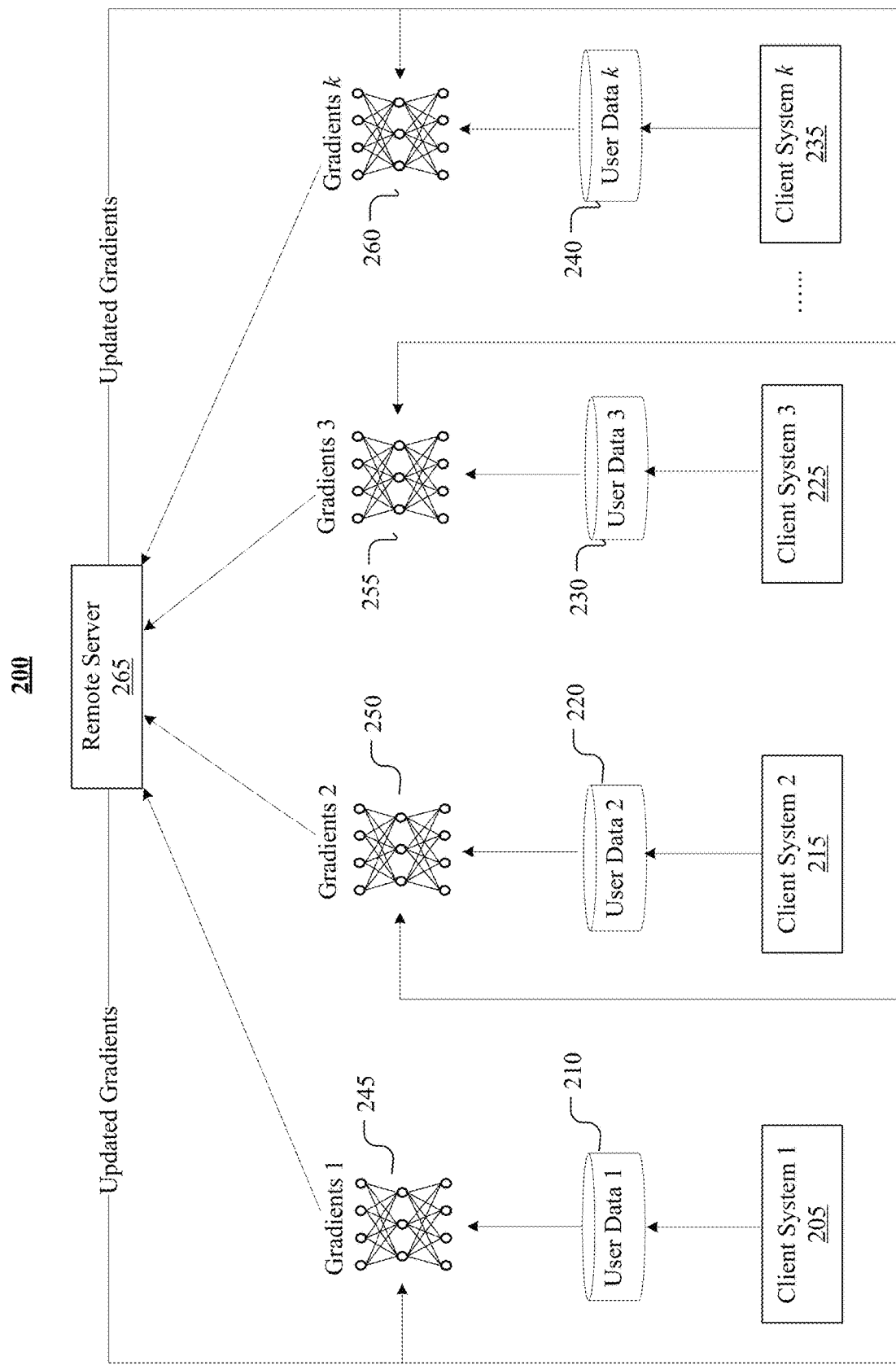
FIG. 2 illustrates an example architecture for federated learning.

Service providers may need user data for training different machine-learning models. However, due to the increasing awareness of data privacy and ownership among the public, users are becoming more and more reluctant to allow data collection. Federated learning has been proposed to train machine-learning models while keeping user data on-device, but model weights or gradients may be still uploaded to the remote servers, potentially leaking information about user data. FIG. 2 illustrates an example architecture for federated learning. To train a machine-learning model, a plurality of client systems may each access user data stored on the respective client system. As an example and not by way of limitation, client system 1205 may access user data 1210, client system 2215 may access user data 2220, client system 3225 may access user data 3230, and client system k 235 may access user data k 240. Each client system may respectively learn gradients based on its own accessed user data. As an example and not by way of limitation, client system 1205 may learn gradients 1245, client system 2215 may learn gradients 2250, client system 3225 may learn gradients 3255, and client system k 235 may learn gradients k 260. The learnt gradients from each client system may be then sent to a remote server 265. The remote server 265 may aggregate the gradients (e.g., by averaging) from those client systems, train the machine-learning model, and then send the trained machine-learning model back to each client system. For the aforementioned architecture of federated learning, the remote server 265 may still infer user data from the gradients, thereby limiting the protection of user privacy. For an enhanced privacy protection, the embodiments disclosed herein apply local differential privacy (LDP), a strict privacy notion, to federated learning. The embodiments disclosed herein develop new LDP algorithms for adding noise and additional mechanism to achieve a good federated learning performance with a small privacy budget. Particular embodiments may apply LDP either to the gradients or to the raw user data. Furthermore, the embodiments disclosed herein develop a splitting and shuffling mechanism, which may avoid privacy degradation caused by high data-dimension and many query iterations. A series of empirical evaluations show that embodiments disclosed herein can not only achieve a better performance but also provide a strong privacy guarantee at the same time. Although this disclosure describes enhancing privacy protection in a particular manner, this disclosure contemplates enhancing privacy protection in any suitable manner.

Certain technical challenges exist for performing federated learning with local privacy perturbation. One technical challenge may include risk of information exposure due to noisy data being close to its original value with high probability. The solution presented by the embodiments disclosed herein to address this challenge may be using the gradient/data-perturbation model that chooses one out of two extreme values as the noisy data since the gradient/data-perturbation model makes it more distinct from its original value. Another technical challenge may include poor accuracy caused by a large variance introduced to the estimated average. The solution presented by the embodiments disclosed herein to address this challenge may be using a tradeoff between a smaller variance or bigger differential privacy may be an effective solution for addressing the technical challenge of poor accuracy caused by a large variance introduced to the estimated average since the embodiments disclosed herein may balance the variance and differential privacy to protect privacy as well as get a respectable accuracy. Another technical challenge may include explosion of privacy budget due to high dimensionality of weights in deep learning models. The solution presented by the embodiments disclosed herein to address this challenge may be using splitting and shuffling model updates since the remote server may be unable to link different gradient/weight values from the same client system after the gradients/weights are split and uploaded anonymously.

Certain embodiments disclosed herein may provide one or more technical advantages. A technical advantage of the embodiments may include flexibility in perturbing gradients or user data based on privacy policies. Another technical advantage of the embodiments may include that the client system may protect the privacy of the whole sub dataset, and the remote server could not successfully get the accurate aggregation information from the perturbed data of each client system. Certain embodiments disclosed herein may provide none, some, or all of the above technical advantages. One or more other technical advantages may be readily apparent to one skilled in the art in view of the figures, descriptions, and claims of the present disclosure.

Many applications may involve training models using highly sensitive data, to name a few, diagnosis of diseases with medical records, or genetic sequences. In order to protect the privacy of the training data, the federated learning framework may be of particular interest since it can provide a central model without touching any sensitive data directly. One advantage of the federated learning framework may be sharing the parameters of the model trained on sensitive data instead of data directly. However, some studies have shown that the parameters may also leak the privacy and help recover the original sensitive data. The embodiments disclosed herein solve the privacy data concern for client and give a practical solution with a new framework, namely Local Differential Private Federated Learning (LDP-FL), to apply local differential privacy into federated learning.

The embodiments disclosed herein illustrate how to use local differential privacy to protect federated learning by the new framework with theoretical guarantees. The embodiments disclosed herein also discuss the different mechanisms to do the local differential privacy and the difference between traditional differential privacy and local differential privacy in federated learning. The embodiments disclosed herein further show that the traditional mechanisms used for traditional differential privacy may also be used for local differential privacy in certain conditions. In addition, the embodiments disclosed herein provide a practical solution that supports the local differential privacy, which can protect the privacy of the gradient updating and the performance of a model. The embodiments disclosed herein evaluate the new framework on MNIST and CIFAR-10 with experimental analysis for this task and provide some non-trivial conclusions while facing different and complex tasks.

Below is an introduction of the definition of differential privacy, local differential privacy and federated learning. To satisfy the increasing demand for preserving privacy, differential privacy (DP) was proposed as a rigorous principle that guarantees provable privacy protection and has been extensively applied. Let $f$ be a deterministic function that maps the dataset D to the real numbers $\mathbb{R}$. This deterministic function $f$, under the context of differential privacy, is called a query function of the dataset D. As an example and not by way of limitation, the query function may request the mean of a feature in the dataset, the gender of each sample. The goal in privacy may be to ensure that when the query function is applied on a different but close dataset D', the outputs of the query function are indistinguishably comparing to that from the dataset D such that the private information of individual entries in the dataset cannot be inferred by malicious attacks. Here, two datasets D and D' may be regarded as adjacent datasets when they are identical except for one single item. A randomized mechanism $\mathcal{M}$ is ($\varepsilon$, $\delta$)-differentially private if for any adjacent dataset D, and D', i.e $|D-D'|_1 \leq 1$, and any output Y of $\mathcal{M}$, has:

$$Pr[\mathcal{M}(D)=Y] \leq e^{\varepsilon} \cdot Pr[\mathcal{M}(D')=Y] + \delta \quad (1)$$

If $\delta=0$, $\mathcal{M}$ is $\varepsilon$-differentially private. The parameter E represents the privacy budget that controls the privacy loss of M. A larger value of E may indicate weaker privacy protection.

Local differential privacy is a concept of privacy tailored to the privacy-preserving data analysis. It aims at providing provable privacy guarantee for each sensitive data sample, unlike general differential privacy is protecting the whole sensitive dataset.

$\varepsilon$-differential privacy may be defined as follows. A randomized mechanism $\mathcal{M}$ is $\varepsilon$-differential privacy, for any pair input x and x' in D, and any output Y of $\mathcal{M}$, $$Pr[\mathcal{M}(x)=Y] \leq e^{\varepsilon} \cdot Pr[\mathcal{M}(x')=Y] \quad (2)$$

where the inputs x and x' are any two inputs. The privacy guarantee of mechanism $\mathcal{M}$ is controlled by privacy budget, denoted as $\varepsilon$. A smaller value of E may indicate a stronger privacy guarantee. According to this definition, a local differentially private algorithm may provide aggregate representations about a set of data items without leaking information of any data item. The immunity to post-processing may also work on local differential privacy, which claims no algorithm can compromise the differentially private output and make it less differentially private. Meanwhile, shuffling and swapping may obtain a better local privacy protection.

One advantage of federated learning is sharing the parameters of the model instead of the private data for better privacy protection. In this case, the federated learning framework that may mitigate the privacy leakage of training a model with limited, unbalanced, massively, or even non-IID data in distributed devices, such as mobiles phones. In the framework of federated optimization, the remote server 265 may be an aggregator that collects a set of weights of local client-side models from the local side and averages the weights after each communication round. One goal may be to maximize the accuracy of both remote and local client-side models while preserving the privacy of the users. In each communication between the remote server 265 and client systems, the remote server only aggregates all gradients or weights information from each client system and updates a new central model (e.g., averaging all clients' weights). The remote server 265 may also distribute the current central model to a fraction of client systems. For each client system, to minimize communication, the local side may take several mini-batch gradient descent steps during a single communication round. Next, the optimized models may be sent back to the remote server 265 and repeat the first step to update the central model. Depending on the performance of the new central model, the training phase may be stopped, or a new communication round may start. However, the communication between the remote server 265 and client systems may be limited and vulnerable to interception. Then, besides federated learning, the embodiments disclosed herein may use differential privacy to protect the dataset.

In the embodiments disclosed herein, examples may alter and approximate each local information with a randomized mechanism. This may be done to totally hide a single client system's contribution within the aggregation and thus within the entire decentralized learning procedure.

In particular embodiments, a first electronic device may access, from a data store associated with the first electronic device, a plurality of initial gradients associated with a machine-learning model. The first electronic device may then select one or more of the plurality of initial gradients for perturbation. In particular embodiments, the first electronic device may generate, based on a gradient-perturbation model, one or more perturbed gradients for the one or more selected initial gradients, respectively. For each selected initial gradient: an input to the gradient-perturbation model may comprise the selected initial gradient having a value x, the gradient-perturbation model may change x into a first continuous value with a first probability or a second continuous value with a second probability, and the first and second probabilities may be determined based on x. In particular embodiments, the first electronic device may further send, from the first electronic device to a second electronic device, the one or more perturbed gradients.

Figure 3:
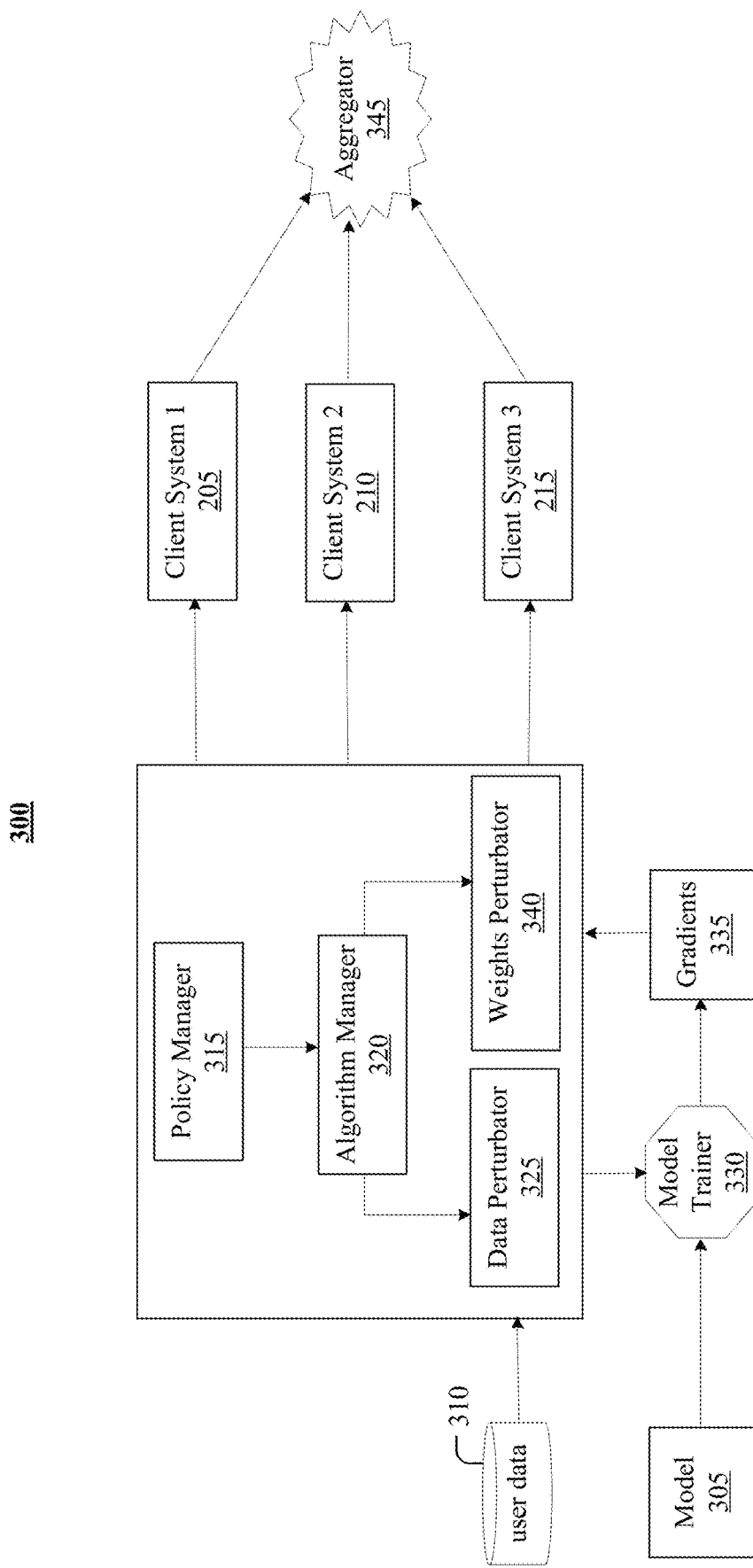
FIG. 3 illustrates an example architecture according to particular embodiments.

FIG. 3 illustrates an example architecture according to particular embodiments. As indicated in FIG. 3, there may be three client systems, e.g., client system 1205, client system 2 210, and client system 3215 associated with the training process of a machine-learning model 305. As an example and not by way of limitation, the first electronic device may be any of these three client systems. In particular embodiments, each client system may access user data 310 stored locally on the client system for training the machine-learning model 305. The client system may use a policy manager 315 to control privacy policies, such as the privacy budget of LDP. The client system may use an algorithm manager 320 to select privacy enforcing algorithms, e.g., LDP algorithms. In particular embodiments, the client system may determine, based on one or more privacy policies, that one or more of the plurality of initial user data 310 should be perturbed. Accordingly, the client system may use a data perturbator 325 to enforce privacy policies such as LDP to perturb the initial user data 310. The perturbed user data may be further sent to a model trainer 330. The model trainer 330 may perform the duty of federated learning locally, e.g., calculating the loss using user data 310. The output of the model trainer 330 may comprise the gradients 335 associated with the machine-learning model 305. In particular embodiments, the client system may determine, based on one or more privacy policies, that one or more of the plurality of initial gradients 335 should be perturbed. Gradients 335 may be associated with the weights of the machine-learning model. In this case, the client system may first use the model trainer 330 to learn the weights based on the user data 310 and then use a weights perturbator 340 to perturb the gradients 335 associated with the weights. All the client systems may send the gradients 335 to an aggregator 345 to aggregate the gradients 335 from each client system. As a result, the embodiments disclosed herein may have a technical advantage of flexibility in perturbing gradients or user data based on privacy policies.

Figure 4:
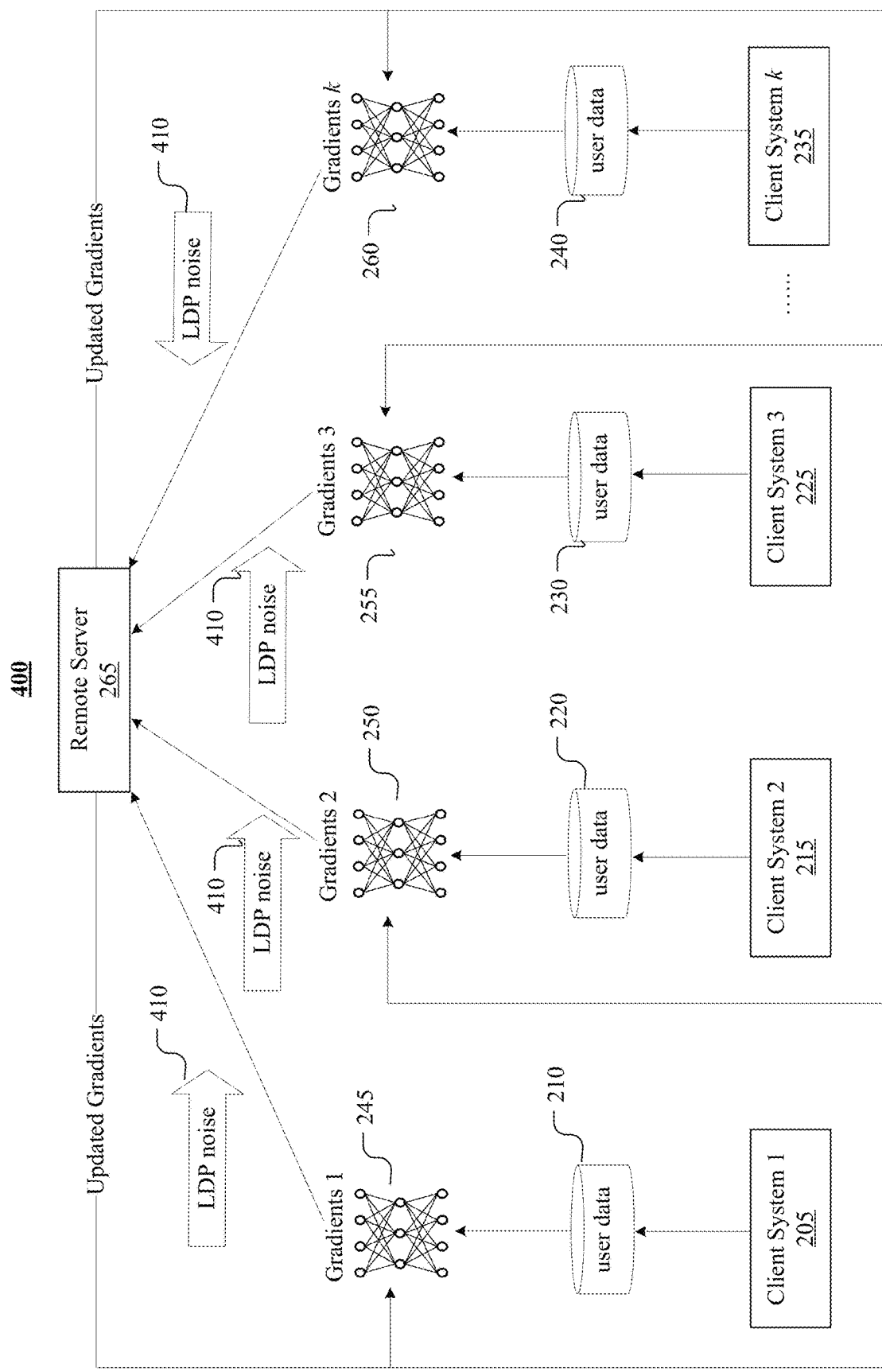
FIG. 4 illustrates an example architecture for perturbing gradients in federated learning.

FIG. 4 illustrates an example architecture for perturbing gradients in federated learning. As indicated in FIG. 4, LDP noise 410 may be applied to the gradients at an insertion point. As an example and not by way of limitation, the first electronic device may be any of the client systems in FIG. 4 whereas the second electronic device may be the remote server 265. In particular embodiments, the remote server 265 may set up a boundary, represented by [min, max], for clipping and initialize federated learning. Clipping may control privacy and accuracy, and prevent backdoor attacks from client systems. For each iteration, for each client system i, and for each weight w, the client system may perturb gradients as follows. The client system may first calculate the gradient $\Delta w$ using its data and clip it so $\Delta w \in [min, max]$. The client system may then apply LDP algorithm A to $\Delta w^i$: $\widehat{\Delta w^i} = A(\Delta w^i)$. The client system may then upload $\widehat{\Delta w^i}$ to the remote server 265 (preferably with a random IP address so that the remote server 265 cannot link the gradients 335 from the same client system). The remote server 265 may collect w's gradients from k client systems and aggregate them. As an example and not by way of limitation, the remote server 265 may calculate the average $$\frac{1}{k}\sum_i \widehat{\Delta w^i}.$$

Alternatively, the client systems may do the above perturbation directly to weights instead of to gradients 335. In particular embodiments, the second electronic device may send the whole machine-learning model back to the first electronic device for it to start the next iteration of learning gradients for the machine-learning model. In alternative embodiments, the first electronic device may receive, at the first electronic device from the second electronic device, a plurality of weights of the machine-learning model. The plurality of weights may be determined based on the one or more perturbed gradients. The first electronic device may further determine, by the first electronic device, a plurality of new gradients for the plurality of weights.

In particular embodiments, the first electronic device may use the following example algorithm to perturb gradients. Let x be a real number within the domain D=[c−r, c+r]. The goal of the algorithm may comprise ensuring LDP but preserving the accuracy of average calculation. The algorithm may be as follows. Let A be the LDP mechanism, it changes x into one of two values with probability:

$$Pr[A(x) = a] = \begin{cases} \frac{(x-c)(e^\epsilon - 1) + r(e^\epsilon + 1)}{2r(e^\epsilon + 1)}, & \text{if } a = c + r \cdot \frac{e^\epsilon + 1}{e^\epsilon - 1} \\ \frac{-(x-c)(e^\epsilon - 1) + r(e^\epsilon + 1)}{2r(e^\epsilon + 1)}, & \text{if } a = c - r \cdot \frac{e^\epsilon + 1}{e^\epsilon - 1} \end{cases} \quad (3)$$

In other words, the gradient-perturbation model may be formulated as:

$$A(x) = \begin{cases} c + r \cdot \frac{e^\epsilon + 1}{e^\epsilon - 1}, & \text{with probability } \frac{(x-c)(e^\epsilon - 1) + r(e^\epsilon + 1)}{2r(e^\epsilon + 1)} \\ c - r \cdot \frac{e^\epsilon + 1}{e^\epsilon - 1}, & \text{with probability } \frac{-(x-c)(e^\epsilon - 1) + r(e^\epsilon + 1)}{2r(e^\epsilon + 1)} \end{cases} \quad (4)$$

In the above formulation: A(x) may represent a changed value of x, c may represent a center value of a value range, r may represent a distance from the center value to boundaries of the value range, c−r may represent the left boundary of the value range, c+r may represent the right boundary of the value range, each selected initial gradient may be clipped into the value range, and E may be a positive real number determined based on a local differential policy. Using the gradient-perturbation algorithm that chooses one out of two extreme values as the noisy data may be an effective solution for addressing the technical challenge of risk of information exposure due to noisy data being close to its original value with high probability since the gradient-perturbation algorithm makes it more distinct from its original value.

The proof of LDP may be illustrated as follows. For either α, $$\frac{Pr[A(x) = a]}{Pr[A(x') = a]} \leq \frac{\max_{x \in D} Pr[A(x) = a]}{\min_{x' \in D} Pr[A(x') = a]} = e^\epsilon.$$

The proof of accuracy of average calculation may be illustrated as:

$$E(A(x)) = \frac{2(x-c)(e^\epsilon - 1)k}{2k(e^\epsilon - 1)} + c = x, \text{ so } E(\overline{A(x)}) = \overline{x} \quad (5)$$

$$Var(A(x)) = E(A^2(x)) - E^2(A(x)) = \left(r \cdot \frac{e^\epsilon + 1}{e^\epsilon - 1}\right)^2 - x^2 \quad (6)$$

$$Var(\overline{A(x)}) = \frac{1}{n^2} \sum_i Var(A(x_i)) \leq \frac{1}{n}\left(r \cdot \frac{e^\epsilon + 1}{e^\epsilon - 1}\right)^2 \quad (7)$$

In particular embodiments, the aforementioned gradient-perturbation model may have a tradeoff that if a smaller r or bigger E is chosen, variance may be smaller but privacy may be worse. Using a tradeoff between a smaller variance or bigger differential privacy may be an effective solution for addressing the technical challenge of poor accuracy caused by a large variance introduced to the estimated average since the embodiments disclosed herein may balance the variance and differential privacy to protect privacy as well as get a respectable accuracy.

In particular embodiments, the first electronic device may access, from a data store associated with the first electronic device, a plurality of initial user data for training a machine-learning model. The first electronic device may select one or more of the plurality of initial user data for perturbation. The first electronic device may then generate, based on a data-perturbation model, one or more perturbed user data for the one or more selected initial user data, respectively. In particular embodiments, the generation for each selected initial user data may comprise the following sub-steps. Firstly, the first electronic device may feed the selected initial user data as an input to the data-perturbation model. The selected initial user data may have a value x within a value range. Secondly, the first electronic device may divide the value range into m intervals. Thirdly, the first electronic device may change x into a center value a of one of the m intervals with a probability 1−p if a distance between x and a is a minimum distance among distances between x and all the center values of the m intervals or a probability p/(m−1) if the distance between x and a is not the minimum distance among distances between x and all the center value of the m intervals. In particular embodiments, the first electronic device may determine, based on the one or more perturbed user data, a plurality of gradients associated with the machine-learning model. The first electronic device may further send, from the first electronic device to a second electronic device, the plurality of gradients.

Figure 5A:
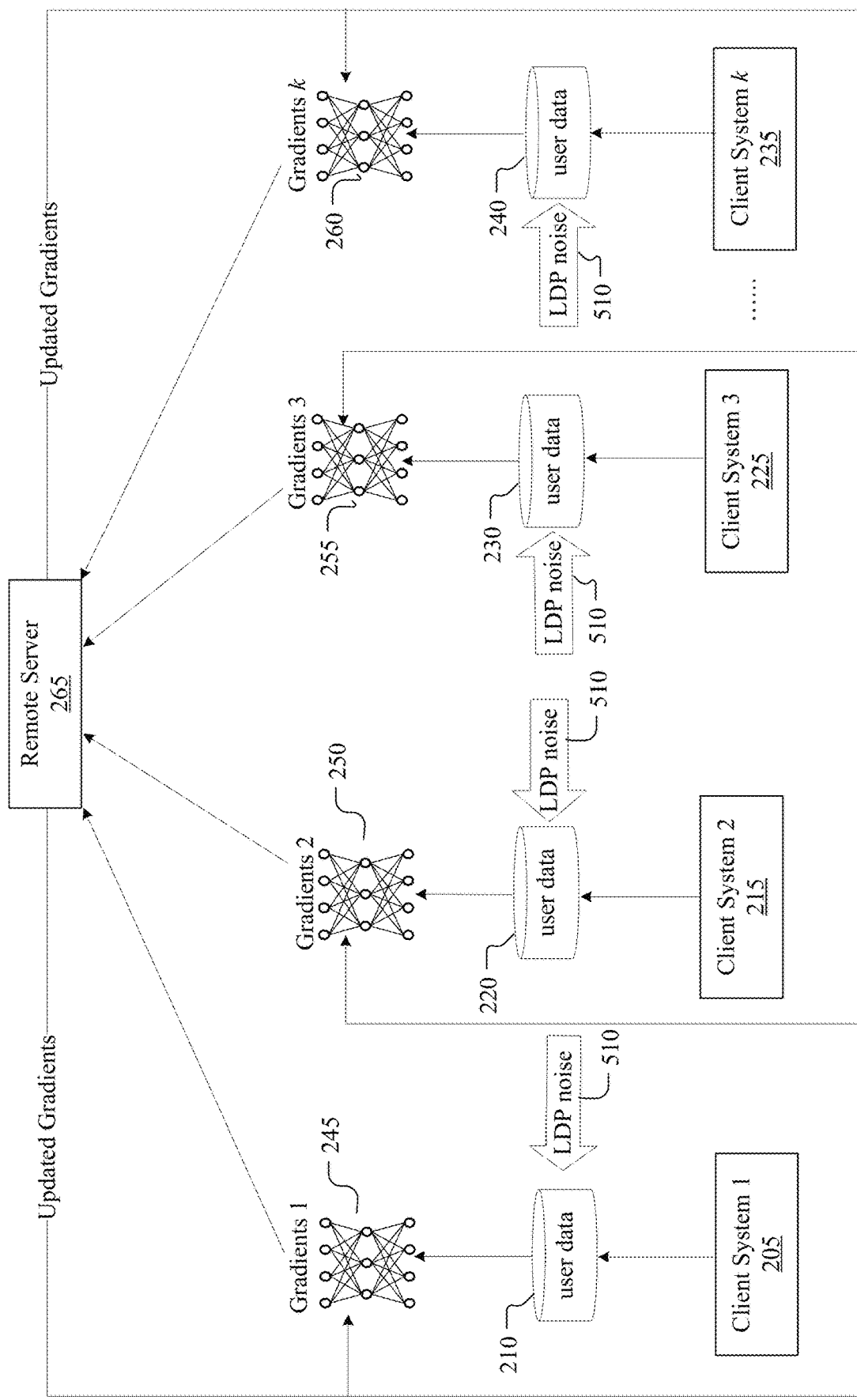
FIG. 5A illustrates an example insertion point for adding LDP noise to user data.
Figure 5B:
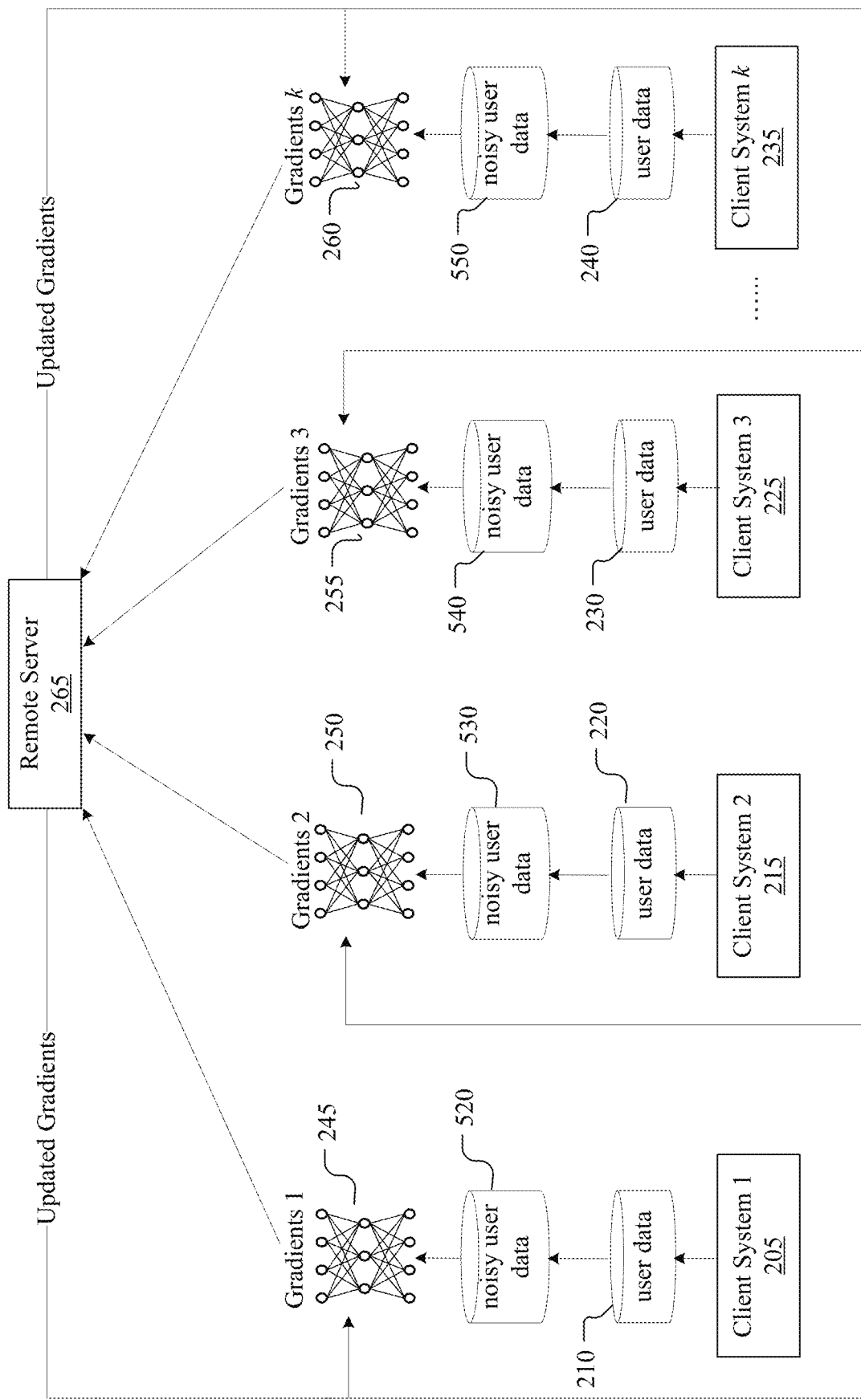
FIG. 5B illustrates an example architecture for federated learning based on perturbed user data.

FIGS. 5A-5B illustrate an example architecture for perturbing user data in federated learning. As an example and not by way of limitation, the first electronic device may be any of the client systems in FIGS. 5A-5B whereas the second electronic device may be the remote server 265. FIG. 5A illustrates an example insertion point for adding LDP noise to user data. As indicated in FIG. 5, each client system may add LDP noise 510 to its user data. As an example and not by way of limitation, client system 1205 may add LDP noise 510 to user data 1210, client system 2215 may add LDP noise 510 to user data 2220, client system 3225 may add LDP noise 510 to user data 3230, and client system k 235 may add LDP noise 510 to user data k 240. This may allow the whole training process to occur on the noisy user data. Optionally, one embodiment may let client systems encode/compress the user data and then apply LDP because large dimensionality of user data may degrade the privacy level.

FIG. 5B illustrates an example architecture for federated learning based on perturbed user data. As indicated in FIG. 5B, by adding LDP noise 510 to the user data, the client systems may respectively generate noisy user data 520, noisy user data 530, noisy user data 540, and noisy user data 550. The client systems may then learn the gradients based on the noisy user data. The client system may then send the learned gradients to the remote server 265. In particular embodiments, the first electronic device may receive, at the first electronic device from the second electronic device, a plurality of weights of the machine-learning model. The plurality of weights may be determined based on the one or more perturbed gradients. The first electronic device may further determine, by the first electronic device, a plurality of new gradients for the plurality of weights. In alternative embodiments, the second electronic device may send the whole machine-learning model back to the first electronic device for it to start the next iteration of learning gradients for the machine-learning model.

Let x be a data item within the domain D, in which x may be binary, categorical, ordinal, discrete or continuous. The goal for data perturbation may comprise ensuring LDP but preserving data fidelity. In particular embodiments, the first electronic device may use the following example algorithm to perturb user data. Firstly, the domain D may be divided into m subdomain/intervals/buckets and a center $\alpha_i$ in each subdomain $D_1$ may be selected. Let A be our LDP mechanism, it may change x into $\alpha_i$ with probability:

$$Pr[A(x) = a_i] = \begin{cases} 1 - p, & \text{if } i = \operatorname*{argmin}_{i \leq m} Dist(x, a_i) \\ \frac{p}{m-1}, & \text{otherwise} \end{cases} \quad (8)$$

In other words, the data-perturbation model may be formulated as:

$$A(x) = \begin{cases} a_i, \text{ with probability } 1 - p, \text{ where } i = \operatorname*{argmin}_{j \leq m} Distance\ (x, a_j) \\ a_k, \text{ with probability } \frac{p}{m-1}, \text{ for any } k \neq i \end{cases} \quad (9)$$

In the above formulation: A(x) may represent a changed value of x, x may be a data item within domain D divided into m subdomains $D_i$ of the value range, j may represent an index indexing each of the m intervals of the value range, $\alpha_j$ may represent the center value of each subdomain of the m intervals of the value range, i represents the index indexing the interval that has the center value that is closest to x, $\alpha_i$ represents the center value that is closest to x, $\alpha_k$ may represent any remaining center value that is not $\alpha_i$, and Distance (x, $\alpha_j$) may be a function measuring a distance between x and $\alpha_j$. Using the data-perturbation model that chooses one out of two extreme values as the noisy data may be an effective solution for addressing the technical challenge of risk of information exposure due to noisy data being close to its original value with high probability since the data-perturbation model makes it more distinct from its original value.

The proof of LDP may be illustrated as follows. For any $$i \leq k, \frac{Pr[A(x) = a_i]}{Pr[A(x') = a_i]} \leq \frac{\max_{x \in D} Pr[A(x) = a_i]}{\min_{x' \in D} Pr[A(x') = a_i]} =$$

$$\max\left(\frac{(1-p)(m-1)}{p}, \frac{p}{(1-p)(m-1)}\right) = e^\epsilon,$$

where $\epsilon = \ln\frac{(m-1)(1-p)}{p}$ if $(1-p)m \geq 1$ or $\epsilon = \ln\frac{p}{(m-1)(1-p)}$ otherwise.

In particular embodiments, the aforementioned data-perturbation model may have a tradeoff that if smaller p or bigger m is chosen, A(x) may be closer to x but the privacy may be worse.

The embodiments disclosed herein may use shuffling and splitting model updates as an effective solution for addressing the technical challenge of explosion of privacy budget due to high dimensionality of weights in deep learning models since the remote server 265 may be unable to link different gradient/weight values from the same client system after the gradients/weights are split and uploaded anonymously. As a result, the remote server 265 cannot infer more information about a particular client system, which makes it sufficient to protect $\in$-LDP for each gradient/weight. Likewise, because of the anonymity, the remote server 265 may be unable to link gradients/weights from the same client system at different iterations. Without splitting and shuffling, the privacy budget of LDP may grow to Td$\in$, where T is the interaction number and d is the number of gradients/weights in the model.

Figure 6:
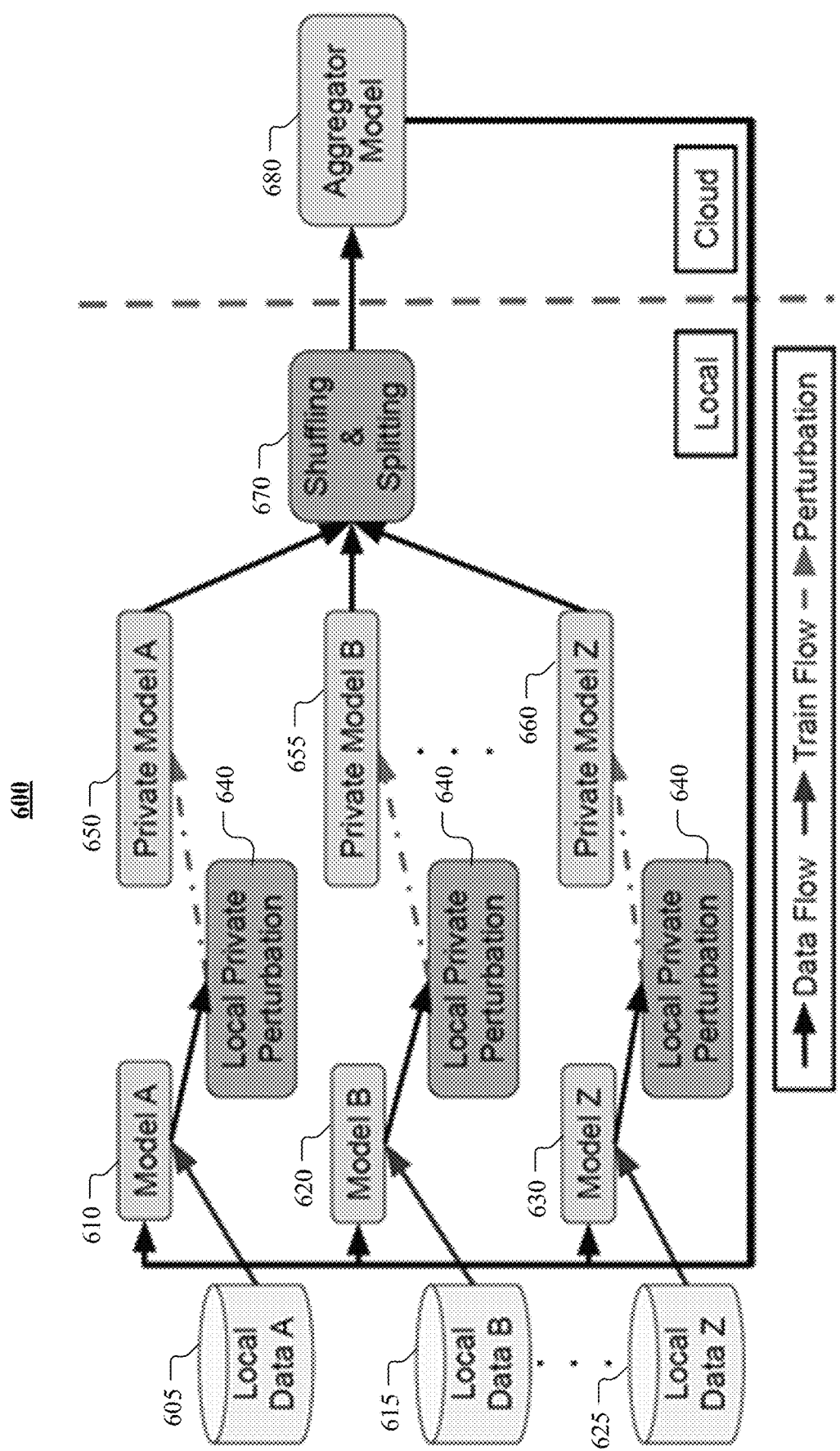
FIG. 6 illustrates an example workflow of federated learning enhanced by splitting and shuffling.

FIG. 6 illustrates an example workflow of federated learning enhanced by splitting and shuffling. The workflow shows a system which relies on federated learning with local differential privacy. Each gradient update of a client system may need to protect the data privacy information with perturbed information for privacy protection locally. As illustrated in FIG. 6, the workflow includes a local process (i.e., on the client systems) and a cloud process (i.e., on the remote server 265). In the local process, based on local data A 605, a client system may learn a model A 610; based on local data B 615, a client system may learn a model B 620; and based on local data Z 625, a client system may learn a model Z 630. These models may then go through local private perturbation 640, which may lead to private model A 650, private model B 655, and private model Z 660. The private models may be processed by a shuffling & splitting module 670. The splitting & shuffling module 670 may ensure that a certain level of anonymity of each client system to the remote server 265 is applied to disassociate their individually identifiable information from their gradients update so that the remote server 265 is unable to directly link the received data with a specific client system. In particular embodiments, such anonymization may be achieved by using multiple mechanisms, depending on how the remote server 265 tracks client systems in a specific scenario. As an example and not by way of limitation, if the remote server 265 tracks client systems by IP address, each client system may adopt an untraceable IP address by using a network proxy, a VPN service, a public WiFi access, and/or the Tor network. The private models may be further sent to the remote server 265 via these untraceable IP addresses. As another example and not by way of limitation, if the remote server 265 tracks client systems by a software-generated metadata such as an identifier (ID), each client system may randomize this metadata before sending it to the remote server 265. In particular embodiments, all of such anonymizations may be done via an anonymizer, which may be a sub-module within the splitting & shuffling module 670. In the cloud process, the remote server 265 may average the perturbed gradient information of all client systems using an aggregator model 680. The remote server 265 may further send the aggregated model to each client system for the next updates. In this way, the embodiments disclosed herein may have a technical advantage that the client system may protect the privacy of the whole sub dataset, and the remote server 265 could not successfully get the accurate aggregation information from the perturbed data of each client system.

In particular embodiments, client systems may not need to trust each other or the remote server 265. As per the definition of local differential privacy, it may protect a user's all data. Notice here "user" refers to who generates or owns the data, not necessarily the client system. The client system may have multiple users' data. As an example and not by way of limitation, a hospital may be associated with a client system, and a sub-dataset may comprise one patient's data. Making the client-side data indistinguishable may require adding a lot of noise and may profoundly affect the performance of federated learning. As local differential privacy only needs each user's data to be indistinguishable, the client system may partition its data into multiple sub-datasets, calculate gradients and add noises on each sub-dataset then send all noisy gradients to the remote server 265.

Figure 7:
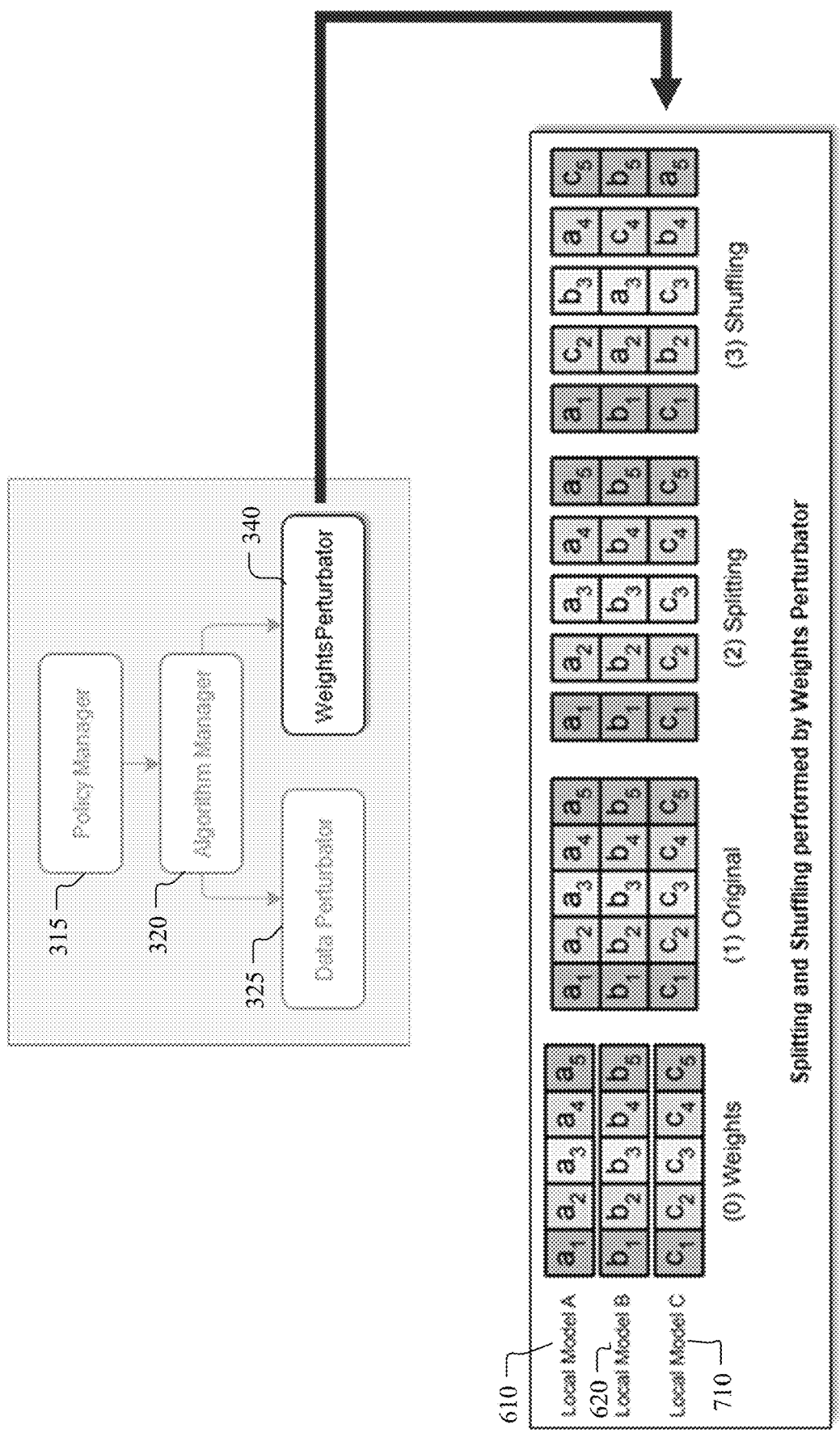
FIG. 7 illustrates an exemplary shuffling and splitting of LDP-FL according to particular embodiments.

FIG. 7 illustrates an exemplary shuffling and splitting of LDP-FL according to particular embodiments. The shuffling mechanism may comprise two parts: splitting and shuffling, which may be carried out by the weights perturbator 340. As illustrated in FIG. 7, the weights as original may be $[a_1, a_2, a_3, a_4, a_5]$ for local model A 610; $[b_1, b_2, b_3, b_4, b_5]$ for local model B 620; and $[c_1, c_2, c_3, c_4, c_5]$ for local model C 710. The splitting may separate the weights associated with each local model while the shuffling may change them to random order. As an example and not by way of limitation, after splitting and shuffling, the weights may be $a_1, c_2, b_3, a_4, c_5$ for local model A 610; $b_1, a_2, a_3, c_4, b_5$ for local model B 620; and $c_1, b_2, c_3, b_4, a_5$ for local model C 710. The main purpose may be to give a stronger privacy protection while using local differential privacy on federated learning. Compared to traditional machine learning, deep learning needs more communications and parameters for a better performance, causing more privacy leakage during the traditional federated learning. Therefore, shuffling and splitting may help save much privacy cost during training phase.

In particular embodiments, the first electronic device (e.g., a client system) may split gradients or weights after local training and assign a distinct Internet Protocol (IP) address to each of the one or more perturbed gradients. The first electronic device may then shuffle the one or more perturbed gradients to a random order. Alternatively, the first electronic device may assign a distinct IP address to each of the one or more perturbed gradients and then shuffle these perturbed gradients to a random order. Correspondingly, the one or more perturbed gradients may be sent based on the random order. Each IP address may only collect the parameter in the original order of the model structure from each local client system. After splitting and shuffling, the remote server 265 may not link the parameters and the client system back, so it can reduce the information leak for the user. Alternatively, the embodiments disclosed herein may assign all client systems the same IP address so that the remote server 265 could not distinguish them.

In particular embodiments, the remote server 265 may randomly assign a new IP address in each communication. All client systems may then send the protected results to the new IP address. Next, the new IP address may randomly shuffle the order of parameters by each client system. Finally, the new IP address may send all protected gradients/weights with random order to the remote server 265. After the remote server 265 updates the new central model, the remote server 265 may repeat the first step to reassign a new IP address. In this case, the remote server 256 may never recover the original gradients/weights from a particular client system in any communication. As a result, the privacy may be better protected.

FIG. 8 illustrates example pseudo-code for federated learning with local privacy perturbation according to particular embodiments. In FIG. 8, M is the number of local client systems; B is the local mini-batch size, E is the number of local epochs, and γ is the learning rate. The embodiments disclosed herein introduce a federated learning approach with local differential privacy that comprises two steps, as shown in FIG. 8.

The first step may be cloud update. Firstly, the remote server 265 may need to randomly initialize the weights at the beginning. The remote server 265 may then randomly select m≤M client systems to update their weights for local-side optimization. The embodiments disclosed herein may fake the IP addresses that allow all local models to use one IP address to send the local weights back to the remote server 265 in each communication. This approach may provide stronger privacy bound and practical solution.

The second step may be local update. Each client system may contain its own private dataset. In each communication, the selected local client systems may update their local models by the weights from the remote server 265. Next, the local models may use Stochastic Gradient Descent (SGD) to optimize the weights of the distinct local models in parallel. In order to provide a practical privacy protection approach, the embodiments disclosed herein may split the weights of each local model and send each parameter through the same IP address to the remote server 265. The embodiments disclosed herein may provide more reliable privacy protection and give a practical solution with available results in real problems.

If each user's data is completely included in one sub-dataset and the client system adds noises to make each sub-dataset indistinguishable, local differential privacy may be satisfied. If the client system randomly partitions the dataset and manages to convince the remote server 265 that each partition belongs to a different user (for instance, by creating multiple accounts and faking IP addresses), local differential privacy may be achieved.

FIG. 9 illustrates example pseudo-code of an embodiment of a local differential privacy mechanism. Given the weights w of model, the algorithm may return a perturbed tuple w* by randomizing each dimension of w. Let A be the mechanism, for each entry p∈w, assuming p∈[c−r, c+r] where c is the center of p's range and r is the radius of the range, p may be changed to p* by the following distribution:

$$p^* = A(p) = \begin{cases} c + r \cdot \frac{(e^\epsilon + 1)}{(e^\epsilon - 1)} & \text{with probability} \cdot \frac{(p - c)(e^\epsilon - 1) + r(e^\epsilon + 1)}{2r(e^\epsilon + 1)} \\ c - r \cdot \frac{(e^\epsilon + 1)}{(e^\epsilon - 1)} & \text{with probability} \cdot \frac{-(p - c)(e^\epsilon - 1) + r(e^\epsilon + 1)}{2r(e^\epsilon + 1)} \end{cases} \quad (10)$$

The embodiments disclosed herein present the LDP Analysis as follows. To begin with, the privacy analysis may be illustrated by the following Theorem 1.

Theorem 1. The Mechanism in Equation (10) Satisfies ϵ-Local Differential privacy.

Proof. It is known the weight p's range is [c−r, c+r]. If $$p^* = c + r \cdot \frac{(e^\epsilon + 1)}{(e^\epsilon - 1)},$$

then for any p, p'∈[c−r, c+r]:

$$\frac{Pr[A(p) = p^*]}{Pr[A(p') = p^*]} \leq \frac{\max_{p} Pr[A(p) = p^*]}{\min_{p'} Pr[A(p') = p^*]} = \frac{r(e^\epsilon - 1) + r(e^\epsilon + 1)}{-r(e^\epsilon - 1) + -r(e^\epsilon + 1)} = e^\epsilon \quad (11)$$

If p*=c−r·

$$\frac{e^\epsilon + 1}{e^\epsilon - 1},$$

the above still holds.

The analysis for bias and variance may be illustrated by the following Theorem 2.

Theorem 2. The Algorithm in FIG. 9 Introduces Zero Bias to Estimating Average Weights, i.e., $\mathbb{E}[a(p_u)] = \bar{p}$.

Proof. For any weight update $p_u$ from any client$_u$, $$\mathbb{E}[A(p_u)] = \left(c + r \cdot \frac{e^\epsilon + 1}{e^\epsilon - 1}\right) \cdot \frac{(p_u - c)(e^\epsilon - 1) + (e^\epsilon + 1)}{2r(e^\epsilon + 1)} + \quad (12)$$

$$\left(c - r \cdot \frac{e^\epsilon + 1}{e^\epsilon - 1}\right) \cdot \frac{-(p_u - c)(e^\epsilon - 1) + (e^\epsilon + 1)}{2r(e^\epsilon + 1)} =$$

$$\frac{2(p_u - c)(e^\epsilon - 1)k}{2k(e^\epsilon - 1)} + c = p_u$$

$$\overline{\mathbb{E}[A(p)]} = \mathbb{E}\left[\frac{1}{n}\sum_u A(p_u)\right] = \frac{1}{n}\sum_u \mathbb{E}[A(p_u)] = \frac{1}{n}\sum(p) = \bar{p} \quad (13)$$

In an embodiment the LDP mechanism introduces a small variance to the estimated average weight $\overline{A(p)}$.

The embodiments disclosed herein further provide the following Theorem 3.

Theorem 3. for any Weight p∈w, with at Least 1−β Probability, $$\overline{|A(p)} - \bar{p}| < O\left(\frac{r\sqrt{\log\beta^{-1}}}{\epsilon\sqrt{n}}\right) \quad (14)$$

Proof First, the bound of the variance of the estimated average can be derived.

$$\text{Var}[A(p_u)] = \mathbb{E}(A^2(p_u)) - \mathbb{E}^2(A(p_u)) = r^2\left(\frac{e^\epsilon + 1}{e^\epsilon - 1}\right)^2 - (p_u - c)^2 \quad (15)$$

$$\text{Var}_{\overline{A(p)}} = \frac{1}{n^2}\sum_u \text{Var}[A(p_u)] = \frac{r^2(e^\epsilon + 1)^2}{n(e^\epsilon - 1)^2} - \frac{1}{n^2}\sum_u (p - c)^2 \quad (16)$$

So the bound of variance is $$\left(\frac{r^2(e^\epsilon + 1)^2}{n(e^\epsilon - 1)^2}\right)^2 - \frac{r^2}{n} \leq \text{Var}_{\overline{A(p)}} \leq \frac{r^2(e^\epsilon + 1)^2}{n(e^\epsilon - 1)^2} \quad (17)$$

For each client u, $$|A(p_u) - p_u| \leq r \cdot \frac{(e^\epsilon + 1)}{(e^\epsilon - 1)} + r =$$

$$\frac{2re^\epsilon}{e^\epsilon - 1} \text{ and } \text{Var}[A(p_u)] = \text{Var} - [A(p_u) - p_u] = \mathbb{E}[A(p_u) - p_u)^2] -$$

$$\mathbb{E}^2[A(p_u) - p_u] = \mathbb{E}[(A(p_u) - p_u)^2] - (p_u p_u)^2 = \mathbb{E}[A(p_u) - p_u)^2],$$

by Bernstein's inequality, $$Pr[_{|\overline{A(p)} - \bar{p}|} \geq \lambda] = Pr\left[\left|\sum_u (A(p_u) - p_u)\right| \geq n\lambda\right] \leq \quad (18)$$

$$2\exp\left(\frac{\frac{1}{2}n^2\lambda^2}{\sum_u \mathbb{E}((A(p_u) - p_u)^2) + \frac{2n\lambda re^\epsilon}{3(e^\epsilon - 1)}}\right) =$$

$$2\exp\left(\frac{n^2\lambda^2}{2\sum_u \text{Var}[A(p_u) - p_u)^2] + \frac{2n\lambda re^\epsilon}{3(e^\epsilon - 1)}}\right) \leq$$

$$2\exp\left(\frac{n^2\lambda^2}{2nr^2\left(\frac{e^\epsilon + 1}{e^\epsilon - 1}\right)^2 + \frac{4n\lambda re^\epsilon}{3(e^\epsilon - 1)}}\right) =$$

$$2\exp\left(\frac{n\lambda^2}{2nr^2\left(\frac{e^\epsilon + 1}{e^\epsilon - 1}\right)^2 + \frac{4n\lambda re^\epsilon}{3(e^\epsilon - 1)}}\right) =$$

$$2\exp\left(\frac{n\lambda^2}{2nr^2\left(\frac{e^\epsilon + 1}{e^\epsilon - 1}\right)^2 + \frac{4n\lambda re^\epsilon}{3(e^\epsilon - 1)}}\right) =$$

$$2\exp\left(\frac{n\lambda^2}{r^2 O(e^{-2}) + \lambda r O(e^{-1})}\right)$$

In other words, there exists $$\times = O\left(\frac{\sqrt[4]{\log\beta^{-1}}}{\sqrt[6]{n}}\right)$$

such that $|\overline{A(p)} - \bar{p}| < \lambda$ holds with at least 1−β probability.

The comparison of the embodiments disclosed herein with other mechanisms is provided as follows. Existing mechanisms may have a common issue, i.e., they generate noisy data that is close to its original value with high probability, revealing the original value's confidence interval. On the contrary, the embodiments disclosed herein choose one out of two extreme values as the noisy data, making it more distinct from its original value. A more specific comparison with the following popular mechanisms is also provided.

Randomized Response Mechanism. This mechanism is for binary or categorical data only, whereas data are numeric in the scenario of federated learning. A modified version of generalized randomized response mechanism was proposed but it introduces asymptotically higher variance to the estimated average than embodiments described herein and is only feasible when E is very large Laplace Mechanism. If the Laplace mechanism is applied to each client system's data p, the variance is $$\text{Var}[A(p_u)] = 2\frac{\Delta^2}{\epsilon^2} = \frac{8r^2}{\epsilon^2}$$

The variance of estimated average over n client systems is $$\mathrm{Var}[\overline{A(p_u)}] = \frac{\mathrm{Var}[A(p_u)]}{n} = \frac{8r^2}{n\epsilon^2},$$

which is higher than the embodiments described herein, shown in Equation (17), when $\epsilon<2.3$ at least. In the best case, Laplace mechanism's variance is always higher than the embodiments described herein for any $\epsilon$. Because a small $\epsilon$ is important to stronger privacy protection, one may decide to choose the Laplace mechanism for lower variance, i.e., a better estimation of average weight updates. The advantages of the Laplace mechanism may include that it is easier to understand, and the noisy data is still continuously distributed.

Gaussian Mechanism. Gaussian mechanism may be frequently used for differential privacy. However, based on the definition of the local differential privacy, currently most works only study $\epsilon$-LDP that does not include the $\delta$ yet. However, the Gaussian mechanism requires relaxing the differential privacy definition and introduces $\delta$, which does not match the scenario of local differential privacy. $\delta$ is the probability that indicate those highly unlikely "bad" events. These "bad" events may break $\epsilon$-differential privacy and usually defined by the size of the dataset. As a result, the Gaussian Mechanism is less secure than the mechanism of the embodiments disclosed herein (without introducing $\delta$).

The comparison of differential privacy (DP) and local differential privacy (LDP) is as follows. It was found that any mechanism for DP may also be used to achieve LDP. Firstly, assume each user has only one value x as their data. If a user's data is treated as a special dataset with only one record, the identity function may be treated as the query function because the server queries for the user's data and the query function's sensitivity is the difference between the max and min of x. Then, any mechanism may be applied for $\epsilon$-DP to x to achieve $\epsilon$-local DP.

When the user's data has dimension k, the embodiments disclosed herein may apply the same mechanism to each dimension independently and achieve k$\epsilon$-local DP. There is a blurry line between DP and LDP. In general, they differ in definition and in whether the noise is added locally or on the remote server. However, they are not mutually exclusive. The definition of LDP is a special case of that of DP. Sometimes, noises are added locally to achieve DP (e.g., via additive secret sharing) instead of LDP.

The embodiments disclosed herein further present experiments that validate the effectiveness of the framework LDP-FL. Image classification tasks and a real mobile application are used as experimental examples to evaluate the effectiveness of the embodiments disclosed herein. First, the effect of different parameters is examined based on the image benchmark datasets MNIST. The performance improvement is then verified on CIFAR-10 and the preceding two datasets.

For image classification tasks, three widely used convolutional deep neural networks (Cony-Small, VGG-Small) may be implemented in LDP-FL. For MNIST, Cony-Small may be used as the cloud-side DNN. In the performance comparison, VGG-Small may be used for CIFAR-10. For image classification tasks, the learning rate and batch size may be set as 0.03 and 10, respectively. The numbers of epochs for MNIST, and CIFAR-10 are 10 and 100, respectively. Considering the randomness during perturbation, the test experiments are run ten times independently to obtain an averaged value.

Table 1 illustrates an exemplary summary of performance analysis percentage. The experiments on MNIST (i.e., a public dataset) achieve a privacy cost of $\epsilon=1$ with merely 0.97% accuracy loss, while the experiments on CIFAR-10 (i.e., another public dataset) achieve a privacy cost of $\epsilon=10$ with only 1.99% accuracy loss.

TABLE 1

|  | $\epsilon = 0$ | $\epsilon = 0.1$ | $\epsilon = 0.5$ | $\epsilon = 1$ | $\epsilon = 5$ | $\epsilon = 10$ |
|---|---|---|---|---|---|---|
| MNIST (k = 100) | 97.26% | — | — | — | — | — |
| MNIST-LDP (k = 100) | 97.26% | 13.84% | 95.36% | 96.24% | | |
| CIFAR (k = 500) | 62.36% | — | — | — | — | — |
| CIFAR-LDP (k = 500) | 62.36% | — | — | 10.00% | 58.89% | 60.37% |

FIG. 10 illustrates example graphs showing effects of data dimension and differential privacy when the model has been trained with pre-assigned perturbation. To verify the performance improvement brought by the embodiments disclosed herein, the performance is evaluated with the number of the client systems. For MNIST, the embodiments disclosed herein implement a two-layer CNN for image classification. However, for CIFAR-10, the default network is not working. Therefore, the embodiments disclosed herein re-design a small VGG for the task. The training data and the testing data are fed into the network directly in each client system, and for each client system, the size of the training data is the total number of the training samples dividing the number of the client systems. In this case, a larger number of client systems implicit the small size of training data of each client system. The learning rate γ is set as 0.03 for MNIST and 0.015 for CIFAR-10. FIG. 10 shows that the embodiments disclosed herein may achieve a performance with a low privacy cost because of the new design of the communication and the new local noise perturbation. It may be not hard to see that while increasing the number of client systems in the training, the LDP-FL may perform as close as the noise-free federated learning. The privacy budget may also affect the performance of the central model.

The analysis of privacy budget is provided as follows. The privacy budget represents the privacy cost in the framework. To analyze the impact of privacy budgets on performance, the scale is chosen from 0.1 to 1 for MNIST and 1 to 10 for CIFAR-10. It may be not hard to see that more complex data and tasks require more privacy cost. The main reason may be that the complex task requires a sophisticated neural network, which contains a large number of model parameters. Meanwhile, the range of each parameter is also wider in the complex task.

FIG. 10 shows that LDP-FL may maintain the accuracy at a high value for a wide range of privacy budgets on MNIST ($\epsilon>0.3$) and CIFAR-10 ($\epsilon<5$). While ($\epsilon>0.3$) for MNIST and ($\epsilon<5$), the accuracy decreases by 90% ($\epsilon=0.1$) and 50% ($\epsilon=1$) for MNIST and CIFAR-10, respectively. The accuracy almost keeps unchanged until $\epsilon$ decreases to 0.1 for MNIST and 1 for CIFAR-10, respectively. The performance drops to 10%, which is the same as a random guess in these two datasets. These results may indicate that LDP-FL applies to different privacy requirements. It may effectively improve the performance even when the privacy budget is relatively tight than previous works and other mechanisms. In addition, the accuracy of LDP-FL is shown when the number of client systems is increasing. It may be evident that more client systems can afford more noise due to the aforementioned privacy analysis.

Figure 11:
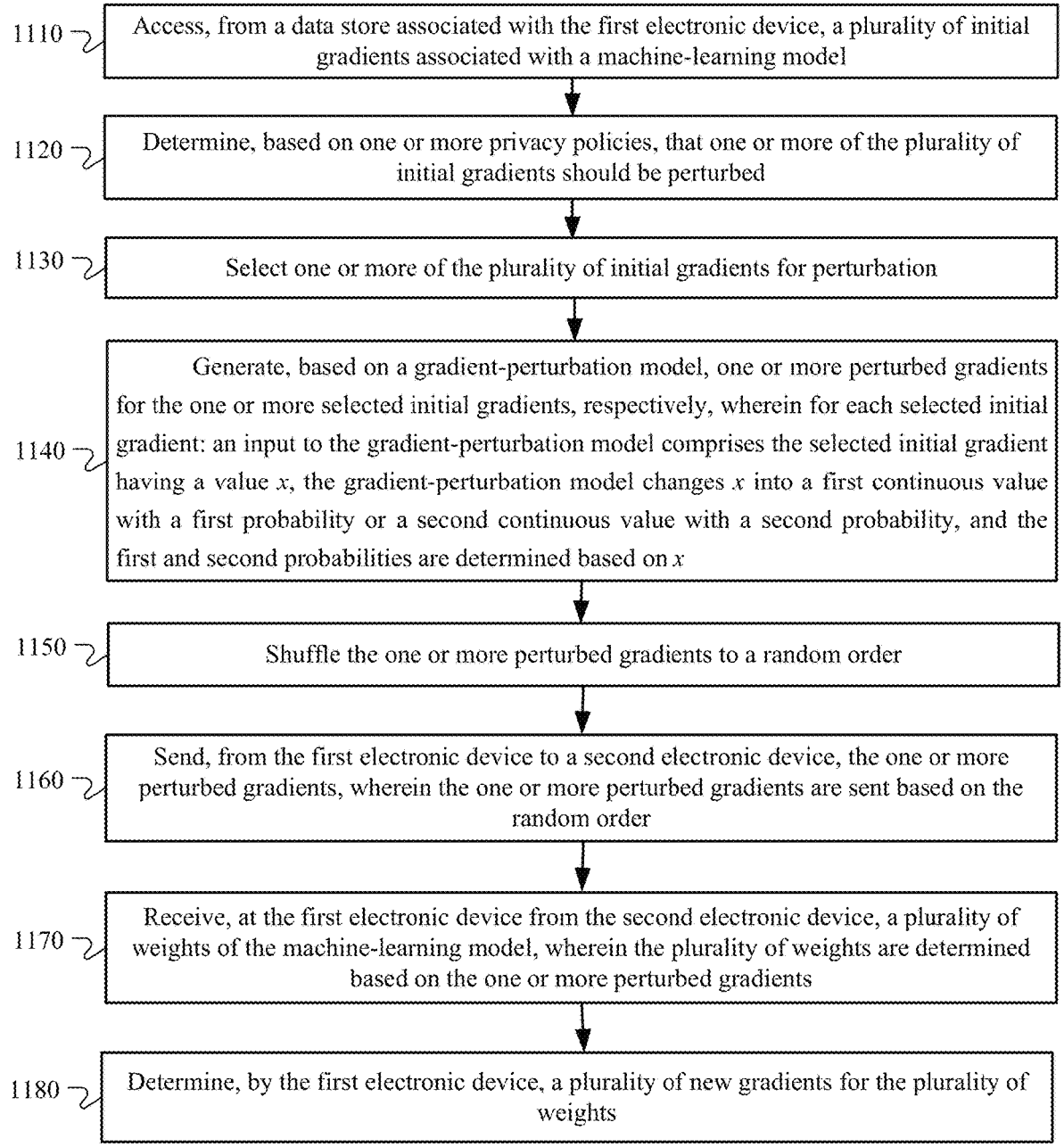
FIG. 11 illustrates is a flow diagram of a method for perturbing gradients in federated learning, in accordance with the presently disclosed embodiments.

FIG. 11 illustrates is a flow diagram of a method for perturbing gradients in federated learning, in accordance with the presently disclosed embodiments. The method 1100 may be performed utilizing one or more processing devices (e.g., of a client system 1-k 205-235) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 1100 may begin at step 1110 with the one or more processing devices (e.g., of a client system 1-k 205-235). For example, in particular embodiments, the first electronic device may access, from a data store associated with the first electronic device, a plurality of initial gradients associated with a machine-learning model. The method 1100 may then continue at step 1120 with the one or more processing devices. For example, in particular embodiments, the first electronic device may determine, based on one or more privacy policies, that one or more of the plurality of initial gradients should be perturbed. The method 1100 may then continue at step 1130 with the one or more processing devices. For example, in particular embodiments, the first electronic device may select one or more of the plurality of initial gradients for perturbation. The method 1100 may then continue at step 1140 with the one or more processing devices. For example, in particular embodiments, the first electronic device may generate, based on a gradient-perturbation model, one or more perturbed gradients for the one or more selected initial gradients, respectively, wherein for each selected initial gradient: an input to the gradient-perturbation model comprises the selected initial gradient having a value x, the gradient-perturbation model changes x into a first continuous value with a first probability or a second continuous value with a second probability, and the first and second probabilities are determined based on x. The method 1100 may then continue at step 1150 with the one or more processing devices. For example, in particular embodiments, the first electronic device may shuffle the one or more perturbed gradients to a random order. The method 1100 may then continue at step 1160 with the one or more processing devices. For example, in particular embodiments, the first electronic device may send, from the first electronic device to a second electronic device, the one or more perturbed gradients, wherein the one or more perturbed gradients are sent based on the random order. The method 1100 may then continue at step 1170 with the one or more processing devices. For example, in particular embodiments, the first electronic device may receive, at the first electronic device from the second electronic device, a plurality of weights of the machine-learning model, wherein the plurality of weights are determined based on the one or more perturbed gradients. The method 1100 may then continue at step 1180 with the one or more processing devices. For example, in particular embodiments, the first electronic device may determine, by the first electronic device, a plurality of new gradients for the plurality of weights. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for perturbing gradients in federated learning including the particular steps of the method of FIG. 11, this disclosure contemplates any suitable method for perturbing gradients in federated learning including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
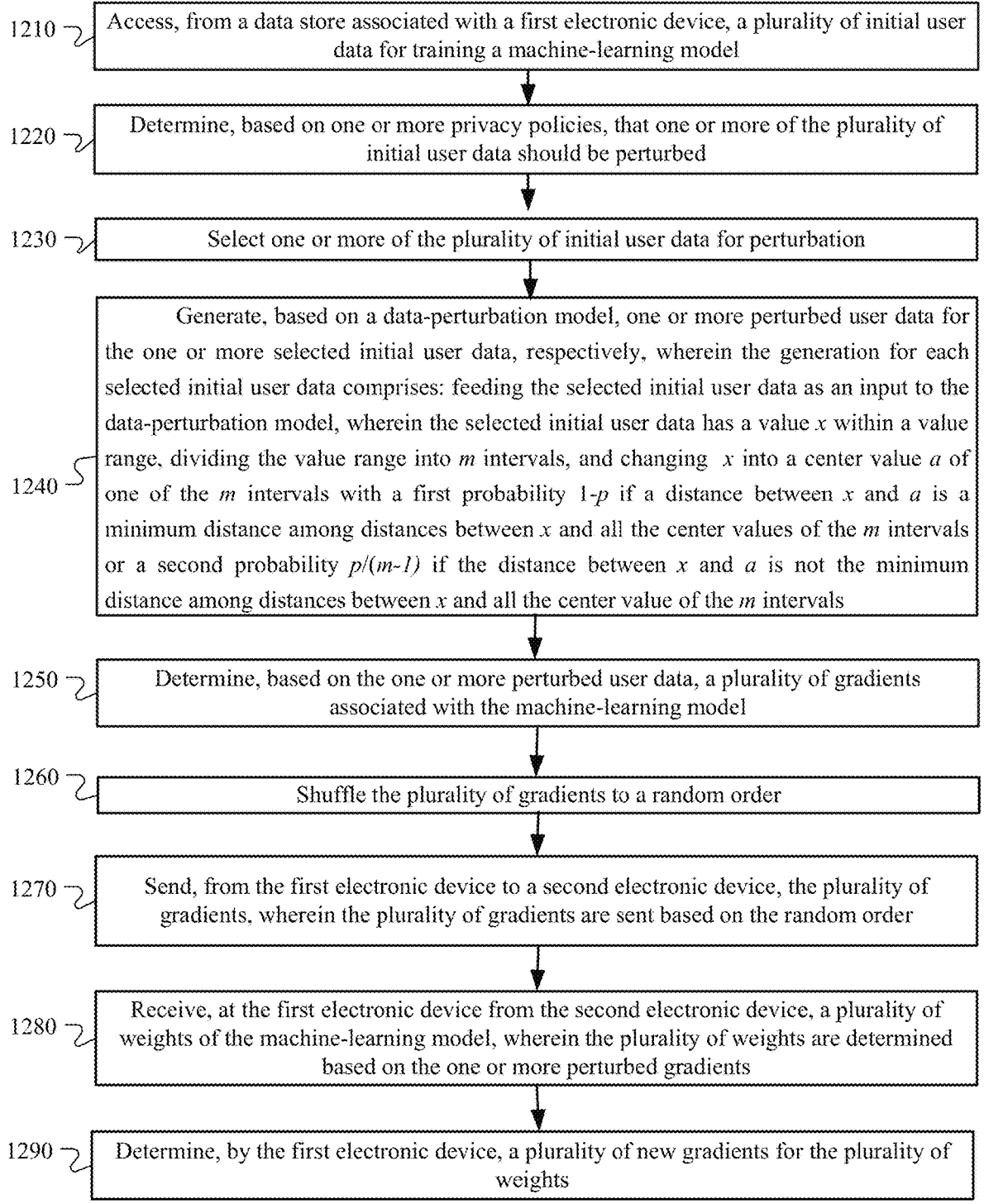
FIG. 12 illustrates is a flow diagram of a method for perturbing user data in federated learning, in accordance with the presently disclosed embodiments.

FIG. 12 illustrates is a flow diagram of a method for perturbing user data in federated learning, in accordance with the presently disclosed embodiments. The method 1200 may be performed utilizing one or more processing devices (e.g., of a client system 1-k 205-235) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 1200 may begin at step 1210 with the one or more processing devices (e.g., of a client system 1-k 205-235). For example, in particular embodiments, the first electronic device may access, from a data store associated with a first electronic device, a plurality of initial user data for training a machine-learning model. The method 1200 may then continue at step 1220 with the one or more processing devices. For example, in particular embodiments, the first electronic device may determine, based on one or more privacy policies, that one or more of the plurality of initial user data should be perturbed. The method 1200 may then continue at step 1230 with the one or more processing devices. For example, in particular embodiments, the first electronic device may select one or more of the plurality of initial user data for perturbation. The method 1200 may then continue at step 1240 with the one or more processing devices. For example, in particular embodiments, the first electronic device may generate, based on a data-perturbation model, one or more perturbed user data for the one or more selected initial user data, respectively, wherein the generation for each selected initial user data comprises: feeding the selected initial user data as an input to the data-perturbation model, wherein the selected initial user data has a value x within a value range, dividing the value range into m intervals, and changing x into a center value a of one of the m intervals with a first probability $1-p$ if a distance between x and a is a minimum distance among distances between x and all the center values of the m intervals or a second probability $p/(m-1)$ if the distance between x and a is not the minimum distance among distances between x and all the center value of them intervals. The method 1200 may then continue at step 1250 with the one or more processing devices. For example, in particular embodiments, the first electronic device may determine, based on the one or more perturbed user data, a plurality of gradients associated with the machine-learning model. The method 1200 may then continue at step 1260 with the one or more processing devices. For example, in particular embodiments, the first electronic device may shuffle the plurality of gradients to a random order. The method 1200 may then continue at step 1270 with the one or more processing devices. For example, in particular embodiments, the first electronic device may send, from the first electronic device to a second electronic device, the plurality of gradients, wherein the plurality of gradients are sent based on the random order. The method 1200 may then continue at step 1280 with the one or more processing devices. For example, in particular embodiments, the first electronic device may receive, at the first electronic device from the second electronic device, a plurality of weights of the machine-learning model, wherein the plurality of weights are determined based on the one or more perturbed gradients. The method 1200 may then continue at step 1290 with the one or more processing devices. For example, in particular embodiments, the first electronic device may determine, by the first electronic device, a plurality of new gradients for the plurality of weights. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for perturbing user data in federated learning including the particular steps of the method of FIG. 12, this disclosure contemplates any suitable method for perturbing user data in federated learning including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Systems and Methods

Figure 13:
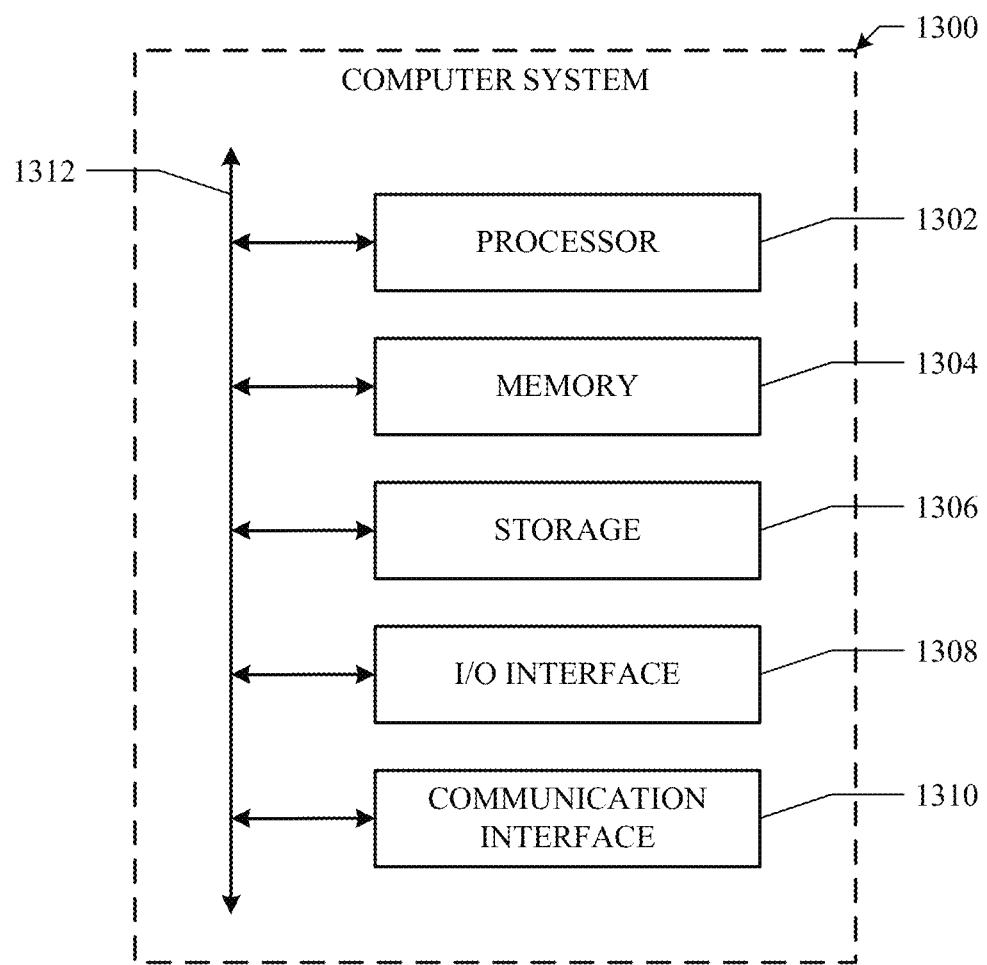
FIG. 13 illustrates an example computer system.

FIG. 13 illustrates an example computer system 1300 that may be utilized to perform federated learning with local privacy perturbation, in accordance with the presently disclosed embodiments. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks.

Where appropriate, one or more computer systems 1300 may perform without substantial spatial or temporal limitation one or more steps of one or more methods described or illustrated herein. As an example, and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement. In particular embodiments, processor 1302 includes hardware for executing instructions, such as those making up a computer program. As an example, and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example, and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302.

Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example, and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere).

One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memory devices 1304, where appropriate. Although this disclosure describes and illustrates particular memory, this disclosure contemplates any suitable memory.

In particular embodiments, storage 1306 includes mass storage for data or instructions. As an example, and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1306 for them. Where appropriate, I/O interface 1308 may include one or more device or software drivers enabling processor 1302 to drive one or more of these I/O devices. I/O interface 1308 may include one or more I/O interfaces 1306, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it.

As an example, and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example, and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

AI Architecture

Figure 14:
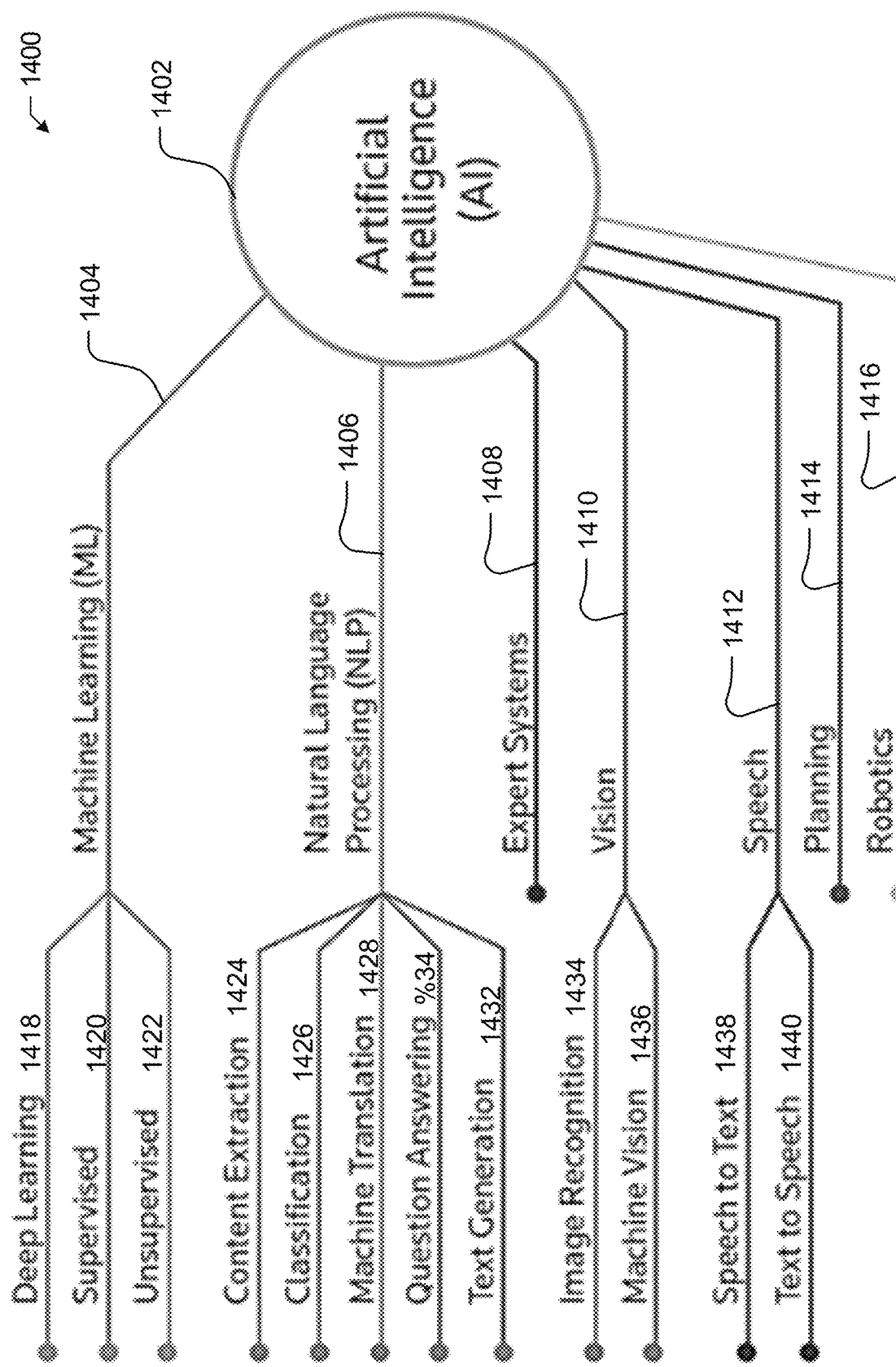
FIG. 14 illustrates a diagram of an example artificial intelligence (AI) architecture.

FIG. 14 illustrates a diagram 1400 of an example artificial intelligence (AI) architecture 1402 that may be utilized to perform federated learning with local privacy perturbation in accordance with the presently disclosed embodiments. In particular embodiments, the AI architecture 1402 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof [97] In particular embodiments, as depicted by FIG. 14, the AI architecture 1402 may include machine leaning (ML) algorithms and functions 1404, natural language processing (NLP) algorithms and functions 1406, expert systems 1408, computer-based vision algorithms and functions 1410, speech recognition algorithms and functions 1412, planning algorithms and functions 1414, and robotics algorithms and functions 1416. In particular embodiments, the ML algorithms and functions 1404 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1404 may include deep learning algorithms 1418, supervised learning algorithms 1420, and unsupervised learning algorithms 1422.

In particular embodiments, the deep learning algorithms 1418 may include any artificial neural networks (ANNs) that may be utilized to learn deep levels of representations and abstractions from large amounts of data. For example, the deep learning algorithms 1418 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1420 may include any algorithms that may be utilized to apply, for example, what has been learned in the past to new data using labeled examples for predicting future events. For example, starting from the analysis of a known training dataset, the supervised learning algorithms 1420 may produce an inferred function to make predictions about the output values. The supervised learning algorithms 1420 can also compare its output with the correct and intended output and find errors in order to modify the supervised learning algorithms 1420 accordingly. On the other hand, the unsupervised learning algorithms 1422 may include any algorithms that may applied, for example, when the data used to train the unsupervised learning algorithms 1422 are neither classified or labeled. For example, the unsupervised learning algorithms 1422 may study and analyze how systems may infer a function to describe a hidden structure from unlabeled data.

In particular embodiments, the NLP algorithms and functions 1406 may include any algorithms or functions that may be suitable for automatically manipulating natural language, such as speech and/or text. For example, in particular embodiments, the NLP algorithms and functions 1406 may include content extraction algorithms or functions 1424, classification algorithms or functions 1426, machine translation algorithms or functions 1428, question answering (QA) algorithms or functions 1430, and text generation algorithms or functions 1432. In particular embodiments, the content extraction algorithms or functions 1424 may include a means for extracting text or images from electronic documents (e.g., webpages, text editor documents, and so forth) to be utilized, for example, in other applications.

In particular embodiments, the classification algorithms or functions 1426 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1428 may include any algorithms or functions that may be suitable for automatically converting source text in one language, for example, into text in another language. The QA algorithms or functions 1430 may include any algorithms or functions that may be suitable for automatically answering questions posed by humans in, for example, a natural language, such as that performed by voice-controlled personal assistant devices. The text generation algorithms or functions 1432 may include any algorithms or functions that may be suitable for automatically generating natural language texts.

In particular embodiments, the expert systems 1408 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1410 may include any algorithms or functions that may be suitable for automatically extracting information from images (e.g., photo images, video images). For example, the computer-based vision algorithms and functions 1410 may include image recognition algorithms 1434 and machine vision algorithms 1436. The image recognition algorithms 1434 may include any algorithms that may be suitable for automatically identifying and/or classifying objects, places, people, and so forth that may be included in, for example, one or more image frames or other displayed data. The machine vision algorithms 1436 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1412 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1438 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1440 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more processors of a first electronic device:
   by one or more of the processors, accessing, from a data store associated with the first electronic device, a plurality of initial gradients that determine the output of a machine-learning model for a given input;
   by one or more of the processors, selecting one or more of the plurality of initial gradients for perturbation;
   by one or more of the processors, obfuscating user-identifying information of a user corresponding to the plurality of initial gradients by generating, based on a gradient-perturbation model, one or more perturbed gradients for the one or more selected initial gradients, respectively, wherein for each selected initial gradient:
      an input to the gradient-perturbation model comprises the selected initial gradient having a value x,
      the gradient-perturbation model perturbs the value x into either of two endpoints of a perturbation range, the two endpoints comprising (1) a first continuous value,
      comprising a lower boundary of the perturbation range defined by a center value c and a distance r from the center c, with a first probability and (2) a second continuous value, comprising an upper boundary of the perturbation range, with a second probability, wherein (1) the first and second probabilities are determined based on x, (2) the first and second probabilities sum to 1, and (3) the first and second probabilities preserve accuracy when averaging initial gradients by making the expectation value of each particular perturbed gradient, E (A (x)), equal to its corresponding initial gradient x, even though the particular perturbed gradient is not equal to the corresponding initial gradient; and
   by one or more of the processors, sending, from the first electronic device to a second electronic device, the one or more perturbed gradients.

2. The method of claim 1, further comprising:
determining, based on one or more privacy policies, that one or more of the plurality of initial gradients should be perturbed.

3. The method of claim 1, further comprising:
receiving, at the first electronic device from the second electronic device, a plurality of weights of the machine-learning model, wherein the plurality of weights are determined based on the one or more perturbed gradients; and
determining, by the first electronic device, a plurality of new gradients for the plurality of weights.

4. The method of claim 1, wherein the perturbation of the one or more selected gradients is performed according to:

$$A(x) = \begin{cases} c + r \cdot \frac{e^\epsilon + 1}{e^\epsilon - 1}, & \text{with probability } \frac{(x-c)(e^\epsilon - 1) + r(e^\epsilon + 1)}{2r(e^\epsilon + 1)} \\ c - r \cdot \frac{e^\epsilon + 1}{e^\epsilon - 1}, & \text{with probability } \frac{-(x-c)(e^\epsilon - 1) + r(e^\epsilon + 1)}{2r(e^\epsilon + 1)} \end{cases},$$

wherein:
A (x) represents the perturbed value of x,
c represents a center value of the perturbation range,
r represents a distance from the center value to boundaries of the perturbation range,
each selected initial gradient is clipped into the value range, and
∈ is a positive real number determined based on a local differential policy.

5. The method of claim 1, further comprising:
shuffling the one or more perturbed gradients to a random order;
wherein the one or more perturbed gradients are sent based on the random order.

6. A computer-readable non-transitory storage media comprising instructions executable by a processor to:
access, from a data store associated with the first electronic device, a plurality of initial gradients that determine the output of a machine-learning model for a given input;
select one or more of the plurality of initial gradients for perturbation;
obfuscate user-identifying information of a user corresponding to the plurality of initial gradients by generating, based on a gradient-perturbation model, one or more perturbed gradients for the one or more selected initial gradients, respectively, wherein for each selected initial gradient:
an input to the gradient-perturbation model comprises the selected initial gradient having a value x,
the gradient-perturbation model perturbs the value x into either of two endpoints of a perturbation range, the two endpoints comprising (1) a first continuous value, comprising a lower boundary of the perturbation range defined by a center value c and a distance r from the center c, with a first probability and (2) a second continuous value, comprising an upper boundary of the perturbation range, with a second probability, wherein (1) the first and second probabilities are determined based on x, (2) the first and second probabilities sum to 1, and (3) the first and second probabilities preserve accuracy when averaging initial gradients by making the expectation value of each particular perturbed gradient, E (A (x)), equal to its corresponding initial gradient x, even though the particular perturbed gradient is not equal to the corresponding initial gradient; and
send, from the first electronic device to a second electronic device, the one or more perturbed gradients.

7. The media of claim 6, wherein the instructions are further executable by the processor to:
determine, based on one or more privacy policies, that one or more of the plurality of initial gradients should be perturbed.

8. The media of claim 6, wherein the instructions are further executable by the processor to:
receive, at the first electronic device from the second electronic device, a plurality of weights of the machine-learning model, wherein the plurality of weights are determined based on the one or more perturbed gradients; and
determine, by the first electronic device, a plurality of new gradients for the plurality of weights.

9. The media of claim 6, wherein the perturbation of the one or more selected gradients is performed according to:

$$A(x) = \begin{cases} c + r \cdot \frac{e^\epsilon + 1}{e^\epsilon - 1}, & \text{with probability } \frac{(x-c)(e^\epsilon - 1) + r(e^\epsilon + 1)}{2r(e^\epsilon + 1)} \\ c - r \cdot \frac{e^\epsilon + 1}{e^\epsilon - 1}, & \text{with probability } \frac{-(x-c)(e^\epsilon - 1) + r(e^\epsilon + 1)}{2r(e^\epsilon + 1)} \end{cases},$$

wherein:
A (x) represents the perturbed value of x,
c represents a center value of the perturbation range,
r represents a distance from the center value to boundaries of the perturbation range,
each selected initial gradient is clipped into the value range, and
∈ is a positive real number determined based on a local differential policy.

10. The media of claim 6, wherein the instructions are further executable by the processor to:
shuffle the one or more perturbed gradients to a random order;
wherein the one or more perturbed gradients are sent based on the random order.

11. A system comprising:
one or more processors; and
a non-transitory memory coupled to the processors comprising instructions executable by the processors, the processors operable when executing the instructions to:
access, from a data store associated with the first electronic device, a plurality of initial gradients that determine the output of a machine-learning model for a given input;
select one or more of the plurality of initial gradients for perturbation;
obfuscate user-identifying information of a user corresponding to the plurality of initial gradients by generating, based on a gradient-perturbation model, one or more perturbed gradients for the one or more selected initial gradients, respectively, wherein for each selected initial gradient:
an input to the gradient-perturbation model comprises the selected initial gradient having a value x,
the gradient-perturbation model perturbs the value x into either of two endpoints of a perturbation range, the two endpoints comprising (1) a first continuous value, comprising a lower boundary of the perturbation range defined by a center value c and a distance r from the center c, with a first probability and (2) a second continuous value, comprising an upper boundary of the perturbation range, with a second probability, wherein (1) the first and second probabilities are determined based on x, (2) the first and second probabilities sum to 1, and (3) the first and second probabilities preserve accuracy when averaging initial gradients by making the expectation value of each particular perturbed gradient, E(A(x)), equal to its corresponding initial gradient x, even though the particular perturbed gradient is not equal to the corresponding initial gradient; and send, from the first electronic device to a second electronic device, the one or more perturbed gradients.

12. The system of claim 11, wherein the processors are further operable when executing the instructions to:
determine, based on one or more privacy policies, that one or more of the plurality of initial gradients should be perturbed.

13. The system of claim 11, wherein the processors are further operable when executing the instructions to:
receive, at the first electronic device from the second electronic device, a plurality of weights of the machine-learning model, wherein the plurality of weights are determined based on the one or more perturbed gradients; and determine, by the first electronic device, a plurality of new gradients for the plurality of weights.

14. The system of claim 11, wherein the perturbation of the one or more selected gradients is performed according to:

$$A(x) = \begin{cases} c + r \cdot \frac{e^\epsilon + 1}{e^\epsilon - 1}, & \text{with probability } \frac{(x-c)(e^\epsilon - 1) + r(e^\epsilon + 1)}{2r(e^\epsilon + 1)} \\ c - r \cdot \frac{e^\epsilon + 1}{e^\epsilon - 1}, & \text{with probability } \frac{-(x-c)(e^\epsilon - 1) + r(e^\epsilon + 1)}{2r(e^\epsilon + 1)} \end{cases},$$

wherein:
A (x) represents the perturbed value of x,
c represents a center value of the perturbation range,
r represents a distance from the center value to boundaries of the perturbation range,
each selected initial gradient is clipped into the value range, and
$\in$ is a positive real number determined based on a local differential policy.

15. The system of claim 11, wherein the processors are further operable when executing the instructions to:
shuffle the one or more perturbed gradients to a random order;
wherein the one or more perturbed gradients are sent based on the random order.

* * * * *